(12) United States Patent
Grant et al.

(10) Patent No.: US 12,533,197 B2
(45) Date of Patent: Jan. 27, 2026

(54) SURGICAL ROBOTIC ARM AND INSTRUMENT DETACHMENT

(71) Applicant: CMR SURGICAL LIMITED, Cambridge (GB)

(72) Inventors: James Oliver Grant, Cambridge (GB); Kenneth Focht, Needham, MA (US); Joseph Gordon, Mansfield, MA (US); Peter Calvin Costello, Raynham, MA (US)

(73) Assignee: CMR SURGICAL LIMITED, Cambridge (GB)

( * ) Notice: Subject to any disclaimer, the term of this patent is extended or adjusted under 35 U.S.C. 154(b) by 26 days.

(21) Appl. No.: 18/293,829

(22) PCT Filed: Aug. 12, 2022

(86) PCT No.: PCT/GB2022/052108
§ 371 (c)(1),
(2) Date: Jan. 31, 2024

(87) PCT Pub. No.: WO2023/017279
PCT Pub. Date: Feb. 16, 2023

(65) Prior Publication Data
US 2024/0335244 A1 Oct. 10, 2024

Related U.S. Application Data

(63) Continuation of application No. 17/400,788, filed on Aug. 12, 2021, now abandoned.

(51) Int. Cl.
*A61B 34/30* (2016.01)
*A61B 17/29* (2006.01)
(Continued)

(52) U.S. Cl.
CPC .............. *A61B 34/30* (2016.02); *A61B 17/29* (2013.01); *A61B 34/37* (2016.02); *B25J 13/06* (2013.01);
(Continued)

(58) Field of Classification Search
CPC ................... A61B 34/30; A61B 34/37; A61B 2017/00477; A61B 2090/064;
(Continued)

(56) References Cited

U.S. PATENT DOCUMENTS 5,784,542 A 7/1998 Ohm et al.
2011/0015650 A1 1/2011 Choi et al.
(Continued)

FOREIGN PATENT DOCUMENTS

DE 102013005493 A1 10/2014
EP 3431032 A1 1/2019
(Continued)

OTHER PUBLICATIONS

Japanese Notification of Reasons for Refusal corresponding to Japanese Application No. 2024-507115 dated Dec. 26, 2024.
(Continued)

*Primary Examiner* — Victor L Macarthur
(74) *Attorney, Agent, or Firm* — Lando & Anastasi, LLP

(57) ABSTRACT

A surgical robot arm comprises a base connected to a terminal link (503) via a series of intermediate joints. The terminal link (503) comprises a drive assembly interface comprising drive assembly interface elements (1101a,b,c). Each drive assembly interface element is configured to: engage an instrument interface element (901a,b,c) of an instrument interface of a robotic surgical instrument when the surgical robot arm engages the robotic surgical instrument; and move relative to the drive assembly interface across a range of motion so as to, when engaged with the
(Continued)

instrument interface element, transfer drive to that instrument interface element. The drive assembly interface elements are arranged across a plane perpendicular to the longitudinal axis of the terminal link such that the robotic surgical instrument is detachable from the surgical robot arm in a detachment direction parallel to the plane when each drive assembly interface element is anywhere within its range of motion.

20 Claims, 16 Drawing Sheets

(51) Int. Cl.
    *A61B 34/37*     (2016.01)
    *B25J 13/06*     (2006.01)
    *A61B 17/00*     (2006.01)

(52) U.S. Cl.
    CPC ........... *A61B 2017/00199* (2013.01); *A61B 2017/00411* (2013.01); *A61B 2017/2903* (2013.01); *A61B 2017/2929* (2013.01); *A61B 2017/2939* (2013.01); *A61B 2034/302* (2016.02); *A61B 2034/305* (2016.02)

(58) Field of Classification Search
    CPC ......... A61B 34/71; A61B 17/00; A61B 34/70; A61B 2034/305; B25J 13/06; B25J 17/00; B25J 17/02
    See application file for complete search history.

(56) References Cited

U.S. PATENT DOCUMENTS

| | | | |
|---|---|---|---|
| 2012/0330286 A1 | 12/2012 | Seibold et al. | |
| 2015/0173731 A1 | 6/2015 | Lohmeier et al. | |
| 2017/0165012 A1 | 6/2017 | Chaplin et al. | |
| 2017/0165016 A1 | 6/2017 | Chaplin et al. | |
| 2017/0165017 A1 | 6/2017 | Chaplin et al. | |
| 2017/0172553 A1 | 6/2017 | Chaplin et al. | |
| 2018/0000472 A1 | 1/2018 | Beira | |
| 2018/0116741 A1 | 5/2018 | Garcia Kilroy et al. | |
| 2018/0353251 A1 | 12/2018 | Cuthbertson et al. | |
| 2018/0360548 A1 | 12/2018 | Marshall et al. | |
| 2019/0223960 A1 | 7/2019 | Chaplin et al. | |
| 2020/0261176 A1 | 8/2020 | Kapadia et al. | |
| 2020/0315645 A1 | 10/2020 | Kim et al. | |

FOREIGN PATENT DOCUMENTS

| | | | |
|---|---|---|---|
| EP | 3797726 A1 | 3/2021 | |
| JP | 2018507727 A | 3/2018 | |
| JP | 2019103608 A | 6/2019 | |
| JP | 2019528139 A | 10/2019 | |
| JP | 2020031768 A | 3/2020 | |
| WO | 2016097861 A1 | 6/2016 | |
| WO | 2017116793 A1 | 7/2017 | |
| WO | 2019135940 A1 | 7/2019 | |
| WO | 2019164856 A1 | 8/2019 | |

OTHER PUBLICATIONS

Notification of Transmittal of the International Search Report and the Written Opinion of the International Searching Authority from corresponding PCT/GB2022/052107 dated Nov. 7, 2022.
Notification of Transmittal of the International Search Report and the Written Opinion of the International Searching Authority from corresponding PCT/GB2022/052108 dated Nov. 8, 2022.
United Kingdom Search Report corresponding to United Kingdom Application No. GB2113241.0 dated Mar. 14, 2022.
United Kingdom Search Report corresponding to United Kingdom Application No. GB2200733.0 dated Jun. 29, 2022.
United Kingdom Search Report corresponding to United Kingdom Application No. GB2310569.5 dated Jul. 25, 2023.

SURGICAL ROBOTIC ARM AND INSTRUMENT DETACHMENT

CROSS-REFERENCE TO RELATED APPLICATIONS

This application is a U.S. National Phase Application under 35 U.S.C. § 371 of International Application No. PCT/GB2022/052108, filed Aug. 12, 2022, which claims priority to U.S. application Ser. No. 17/400,788, filed Aug. 12, 2021. Each application referenced above is hereby incorporated by reference in its entirety for all purposes.

BACKGROUND

It is known to use robots for assisting and performing surgery. FIG. 1 illustrates a typical surgical robotic system. A surgical robot 100 consists of a base 102, an arm 104 and an instrument 106. The base supports the robot, and may itself be attached rigidly to, for example, the operating theatre floor, the operating theatre ceiling or a cart. The arm extends between the base and the instrument. The arm is articulated by means of multiple flexible joints 108 along its length, which are used to locate the surgical instrument in a desired location relative to the patient. The surgical instrument is attached to the distal end of the robot arm. The surgical instrument penetrates the body of the patient at a port so as to access the surgical site. The surgical instrument comprises a shaft connected to a distal end effector 110 by a jointed articulation. The end effector engages in a surgical procedure. In FIG. 1, the illustrated end effector is a pair of jaws.

A surgeon controls the surgical robot 100 via a remote surgeon console 112. The surgeon console comprises one or more surgeon input devices 114. These may take the form of a hand controller or foot pedal. The surgeon console also comprises a display 116.

A control system 118 connects the surgeon console 112 to the surgical robot 100. The control system receives inputs from the surgeon input device(s) 114 and converts these to control signals to move the joints of the robot arm 104 and instrument 106. The control system sends these control signals to the robot, where the corresponding joints are driven accordingly.

Some movements of the end effector 110, such as a translation, are enabled solely by articulating the robot arm 104. Other movements of the end effector 110, such as changing the pose of the end effector or opening and closing the jaws of the end effector, are enabled by articulating the joints in the articulation of the instrument. Mechanical drive for driving the instrument's joints is transferred from the robot arm to the instrument at an interface between the two.

Several instruments are typically used during the course of a surgical procedure. It is desirable for an instrument to be easily detachable from and attachable to the robot arm in order to facilitate exchange of one instrument for another on the robot arm mid-surgery. Typically, a change of instrument is performed by first moving the robot arm away from the patient so as to withdraw the instrument from the surgical site along the direction of the instrument's shaft and out of the patient's body. Once the instrument is outside the patient's body it can be manually detached from the robot arm. The robot arm and/or instrument may need to adopt a detachment configuration in order to enable them to be detached. Detaching the instrument from the robot arm may require the instrument to be moved along the longitudinal axis of the end of the robot arm away from the robot arm before it can be released from the robot arm. Such a requirement is inconsequential when the instrument is located outside of the patient's body. However, in the event of a system fault or power failure/disruption with the robot arm, it may not be possible to robotically control the robot arm to move so as to extract the instrument from the patient's body, or to robotically control the robot arm and/or instrument to adopt the detachment configurations. Thus, as a safety measure, it is desirable to be able to manually detach the instrument from the robot arm safely whilst the instrument is located at the surgical site. As such, it is an aim of a robot arm/instrument interface to enable the instrument to be safely manually detached from the robot arm whilst the instrument is at the surgical site.

It is also an aim of a robot arm/instrument interface to provide mechanical drive from the robot arm to the instrument in a mechanically robust manner that efficiently transfers force from the arm to the instrument.

SUMMARY OF THE INVENTION

According to an aspect of the invention, there is provided a surgical robot arm comprising:
  a terminal link comprising a drive assembly interface, the drive assembly interface comprising drive assembly interface elements, each drive assembly interface element configured to:
    engage an instrument interface element of an instrument interface of a robotic surgical instrument when the surgical robot arm engages the robotic surgical instrument; and
    move relative to the drive assembly interface through a range of motion so as to, when engaged with the instrument interface element, transfer drive to that instrument interface element;
  wherein the drive assembly interface elements are arranged on a plane perpendicular to the longitudinal axis of the terminal link such that the robotic surgical instrument is detachable from the surgical robot arm in a detachment direction parallel to the plane.

The drive assembly interface elements may be arranged on the plane perpendicular to the longitudinal axis of the terminal link such that the robotic surgical instrument is detachable from the surgical robot arm without moving the instrument interface elements relative to the instrument.

The drive assembly interface elements may be arranged on the plane perpendicular to the longitudinal axis of the terminal link such that the robotic surgical instrument is detachable from the surgical robot arm in the detachment direction parallel to the plane when each drive assembly interface element is anywhere within its range of motion, without first moving the robotic surgical instrument relative to the surgical robot arm in a direction parallel with the longitudinal axis of the terminal link by more than a maximum amount.

Said maximum amount may be either: (i) zero, or (ii) a non-zero amount which is small enough to avoid damage to a patient, but is large enough to disengage the drive assembly interface elements from the instrument interface elements, thereby allowing the robotic surgical instrument to be detached from the surgical robot arm in the detachment direction.

Each drive assembly interface element may be configured to move relative to the drive assembly interface along or parallel to the longitudinal axis of the terminal link.

Each drive assembly interface element may be configured to move relative to the drive assembly interface in a direction perpendicular to the longitudinal axis of the terminal link.

The drive assembly interface elements may be configured to move parallel to each other.

Each drive assembly interface element may be configured to move relative to the drive assembly interface in a direction perpendicular to the detachment direction.

The range of motion of each drive assembly interface element might not overlap with the range of motion of another drive assembly interface element in the direction perpendicular to the detachment direction.

Each drive assembly interface element may be configured to engage its respective instrument interface element in a position offset perpendicular to the longitudinal axis of the terminal link from the positions in which the other drive assembly interface elements are configured to engage their respective instrument interface elements.

The drive assembly interface elements may be configured to move in non-parallel directions relative to each other.

The drive assembly interface elements may be configured to move on the same plane perpendicular to the longitudinal axis of the terminal link.

The drive assembly interface elements may be in a stepped arrangement on said plane perpendicular to the longitudinal axis of the terminal link, wherein the drive assembly interface elements may be configured to move in non-overlapping planes perpendicular to the longitudinal axis of the terminal link.

Each of the drive assembly interface elements may be configured to rotate about a respective axis that is parallel to the longitudinal axis of the terminal link.

The surgical robot arm may be configured to, when the robotic surgical instrument is to be detached from the surgical robot arm, drive the drive assembly interface elements to a particular configuration within their ranges of motion in which the robotic surgical instrument is detachable from the surgical robot arm in the detachment direction.

The drive assembly interface may further comprise a protrusion which is configured to interlock with a corresponding protrusion on the instrument interface, and which allows the instrument to be moved in a direction parallel with the longitudinal axis of the terminal link by a small permissible amount, which is small enough to avoid damage to a patient, but is large enough to disengage the drive assembly interface elements from the instrument interface elements, thereby allowing the robotic surgical instrument to be detached from the surgical robot arm in the detachment direction.

The surgical robot arm may further comprise a base connected to the terminal link via a series of intermediate joints.

According to another aspect of the invention, there is provided a robotic surgical instrument comprising:
  a shaft;
  driving elements running through the shaft for driving an articulation at a distal end of the shaft to articulate an end effector; and
  an instrument interface at a proximal end of the shaft, the instrument interface comprising instrument interface elements, each instrument interface element attached to one of the driving elements and configured to:
    engage a drive assembly interface element of a drive assembly interface of a surgical robot arm when the robotic surgical instrument engages the surgical robot arm; and
    move relative to the instrument interface through a range of motion so as to, when engaged with the drive assembly interface element, transfer drive from the drive assembly interface element to the attached driving element;
  wherein the instrument interface elements are arranged on a plane perpendicular to the longitudinal axis of the shaft such that the robotic surgical instrument is detachable from the surgical robot arm in a detachment direction parallel to the plane.

The instrument interface elements may be arranged on the plane perpendicular to the longitudinal axis of the shaft such that the robotic surgical instrument is detachable from the surgical robot arm without moving the instrument interface elements relative to the instrument.

The instrument interface elements may be arranged on the plane perpendicular to the longitudinal axis of the shaft such that the robotic surgical instrument is detachable from the surgical robot arm in a detachment direction parallel to the plane when each instrument interface element is anywhere within its range of motion, without first moving the robotic surgical instrument relative to the surgical robot arm in a direction parallel with the longitudinal axis of the shaft by more than a maximum amount.

Said maximum amount may be either: (i) zero, or (ii) a non-zero amount which is small enough to avoid damage to a patient, but is large enough to disengage the drive assembly interface elements from the instrument interface elements, thereby allowing the robotic surgical instrument to be detached from the surgical robot arm in the detachment direction.

Each instrument interface element may be configured to move relative to the instrument interface along or parallel to the longitudinal axis of the shaft.

Each instrument interface element may be configured to move relative to the instrument interface in a direction perpendicular to the longitudinal axis of the shaft.

The instrument interface elements may be configured to move parallel to each other.

Each instrument interface element may be configured to move relative to the instrument interface in a direction perpendicular to the detachment direction.

The range of motion of each instrument interface element might not overlap with the range of motion of another instrument interface element in the direction perpendicular to the detachment direction.

Each instrument interface element may be configured to engage its respective drive assembly interface element in a position offset perpendicular to the longitudinal axis of the shaft from the positions in which the other instrument interface elements are configured to engage their respective drive assembly interface elements.

The instrument interface elements may be configured to move in non-parallel directions relative to each other.

The instrument interface elements may be configured to move on the same plane perpendicular to the longitudinal axis of the shaft.

The instrument interface elements may be in a stepped arrangement on said plane perpendicular to the longitudinal axis of the shaft, and wherein the instrument interface elements may be configured to move in non-overlapping planes perpendicular to the longitudinal axis of the shaft.

Each of the instrument interface elements may be configured to rotate about a respective axis that is parallel to the longitudinal axis of the shaft.

The instrument interface elements may be arranged to be driven, when the robotic surgical instrument is to be detached from the surgical robot arm, to a particular configuration within their ranges of motion in which the robotic surgical instrument is detachable from the surgical robot arm in the detachment direction.

The instrument interface may further comprise a protrusion which is configured to interlock with a corresponding protrusion on the drive assembly interface, and which allows the instrument to be moved in a direction parallel with the longitudinal axis of the shaft by a small permissible amount, which is small enough to avoid damage to a patient, but is large enough to disengage the instrument interface elements from the drive assembly interface elements, thereby allowing the robotic surgical instrument to be detached from the surgical robot arm in the detachment direction.

BRIEF DESCRIPTION OF THE FIGURES

The present invention will now be described by way of example with reference to the accompanying drawings. In the drawings.

DETAILED DESCRIPTION

Figure 1:
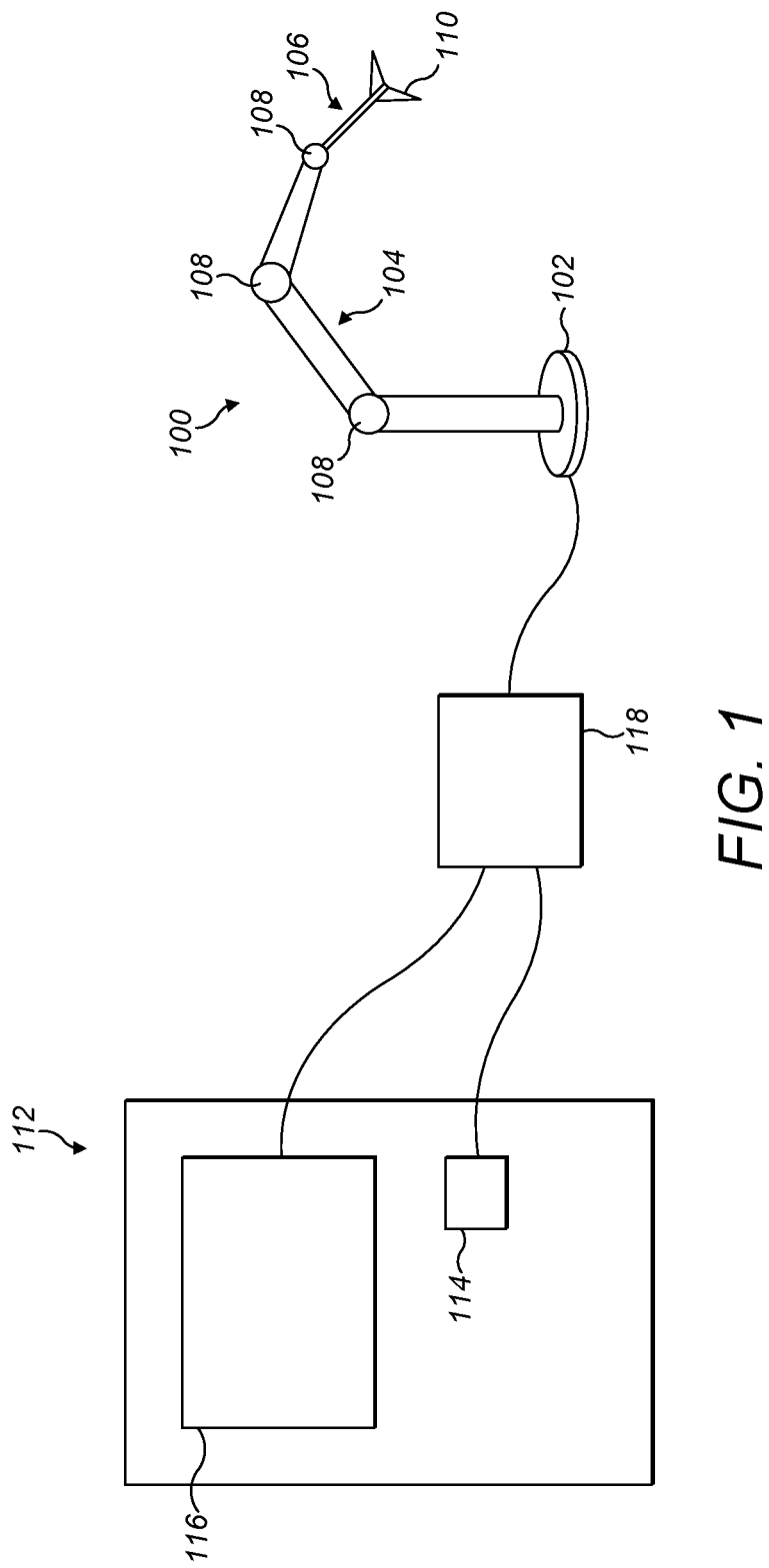
FIG. 1 illustrates a surgical robot system for performing a surgical procedure.

The following describes example interfaces between a surgical robotic arm and a surgical instrument. The surgical robotic arm and surgical instrument form part of a surgical robotic system of the type illustrated in FIG. 1.

Figure 2:
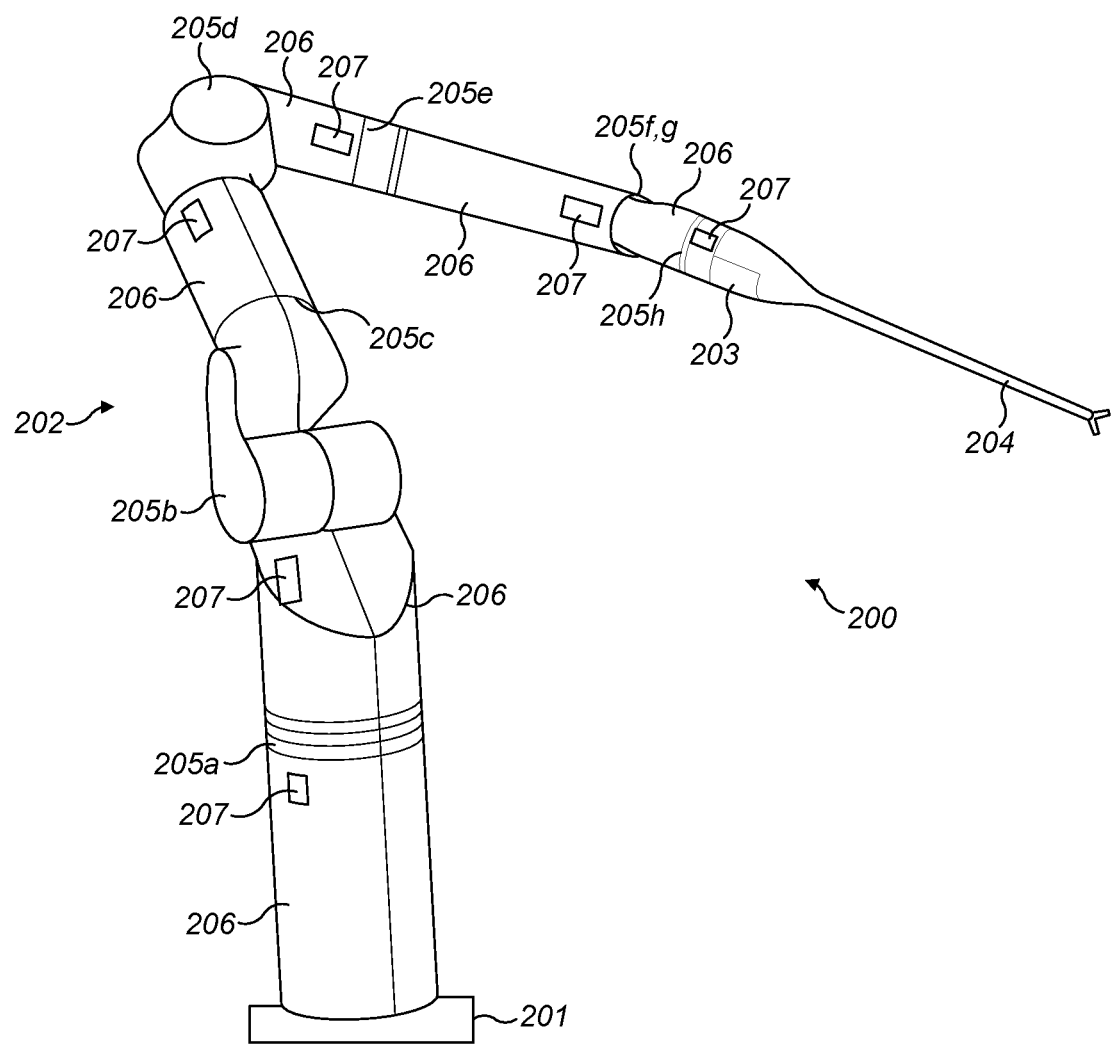
FIG. 2 illustrates a surgical robot.

FIG. 2 illustrates an example robot 200. The robot comprises a base 201 which is fixed in place when a surgical procedure is being performed. Suitably, the base 201 is mounted to a chassis. That chassis may be a cart, for example a bedside cart for mounting the robot at bed height. Alternatively, the chassis may be a ceiling mounted device, or a bed mounted device.

A robot arm 202 extends from the base 201 of the robot to a terminal link 203 to which a surgical instrument 204 can be attached. The arm is flexible. It is articulated by means of multiple flexible joints 205 along its length. In between the joints are rigid arm links 206. The arm in FIG. 2 has eight joints. The joints include one or more roll joints (which have an axis of rotation along the longitudinal direction of the arm members on either side of the joint), one or more pitch joints (which have an axis of rotation transverse to the longitudinal direction of the preceding arm member), and one or more yaw joints (which also have an axis of rotation transverse to the longitudinal direction of the preceding arm member and also transverse to the rotation axis of a co-located pitch joint). In the example of FIG. 2: joints 205a, 205c, 205e and 205h are roll joints; joints 205b, 205d and 205f are pitch joints; and joint 205g is a yaw joint. Pitch joint 205f and yaw joint 205g have intersecting axes of rotation. The order of the joints from the base 201 to the terminal link 203 of the robot arm is thus: roll, pitch, roll, pitch, roll, pitch, yaw, roll. However, the arm could be jointed differently. For example, the arm may have fewer than eight or more than eight joints. The arm may include joints that permit motion other than rotation between respective sides of the joint, for example a telescopic joint. The robot comprises a set of drivers 207. Each driver 207 has a motor which drives one or more of the joints 205. The terminal link 203 of the robot arm comprises a drive assembly for interfacing and driving a surgical instrument. The drive assembly will be described in more detail below.

Figure 3:
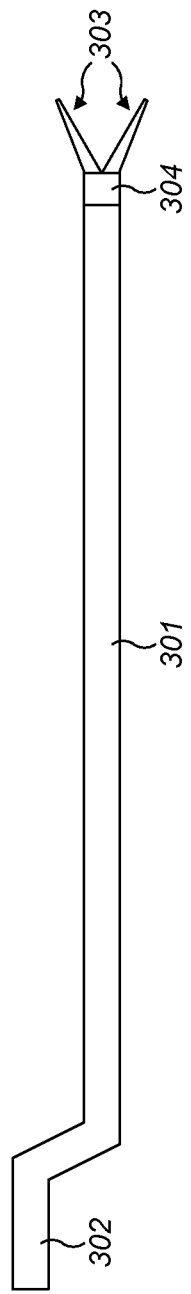
FIG. 3 illustrates an exemplary surgical instrument.

FIG. 3 illustrates a surgical instrument 204. The surgical instrument has an elongate profile, with a shaft 301 spanning between its proximal end which is attached to the robot arm and its distal end which accesses the surgical site within the patient body. Suitably, the shaft is rigid. The shaft may be straight. The proximal end of the surgical instrument and the instrument shaft may be rigid with respect to each other and rigid with respect to the distal end of the robot arm when attached to it. At the proximal end of the instrument, the shaft 301 is connected to an instrument interface 302. The instrument interface engages with the drive assembly interface at the distal end of the robot arm as will be described in more detail below. At the distal end of the surgical instrument, the distal end of the shaft is connected to an end effector 303 by an articulation 304. The end effector 303 engages in a surgical procedure at the surgical site. The end effector may take any suitable form. For example, the end effector could be a pair of curved scissors, an electrosurgical instrument such as a pair of monopolar scissors, a needle holder, a pair of jaws, or a fenestrated grasper.

During setup of the surgical robotic system, a virtual pivot point may be determined. The virtual pivot point is the natural centre of rotation of an instrument having a rigid shaft as that instrument moves in the patient's body. In other words, the virtual pivot point is a fulcrum about which the surgical instrument pivots when the configuration of the surgical robot arm is altered whilst inside the port in the patient's body. For example, a port may be inserted into the abdominal wall of a patient, wherein the length of the port may be in the range 2-10 cm. In this example, the instrument is inserted into the patient's body through the port, and the virtual pivot point lies along the length of the port. The exact location of the virtual pivot point depends on the patient's anatomy, and hence differs from patient to patient.

Figure 4A:
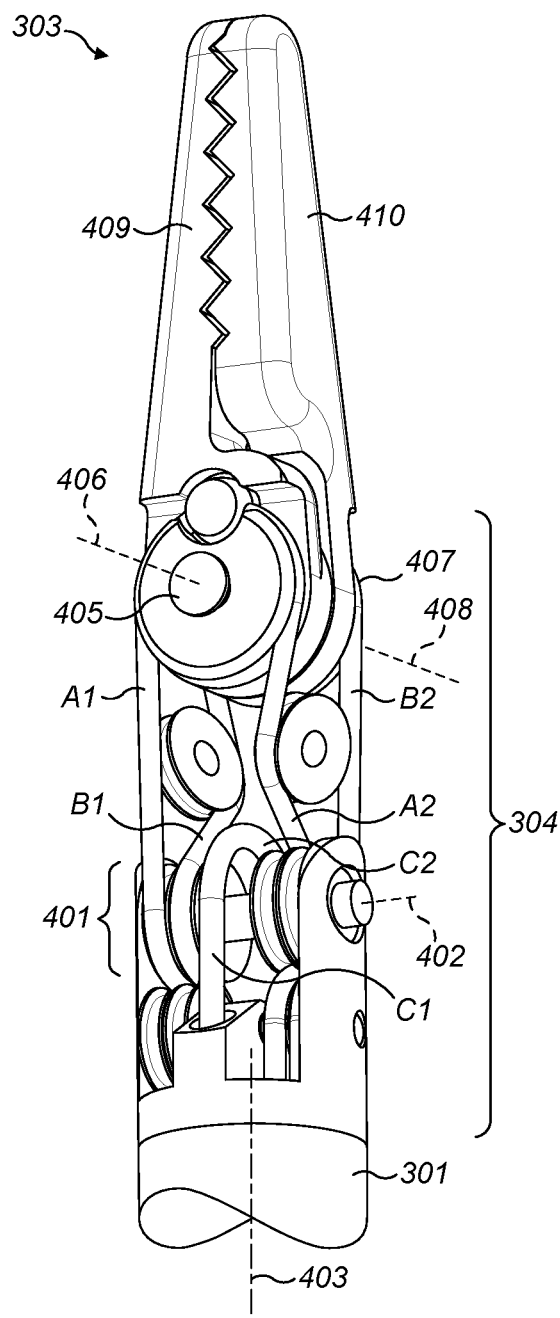
FIGS. 4a and 4b illustrate the distal end of an exemplary surgical instrument.
Figure 4B:
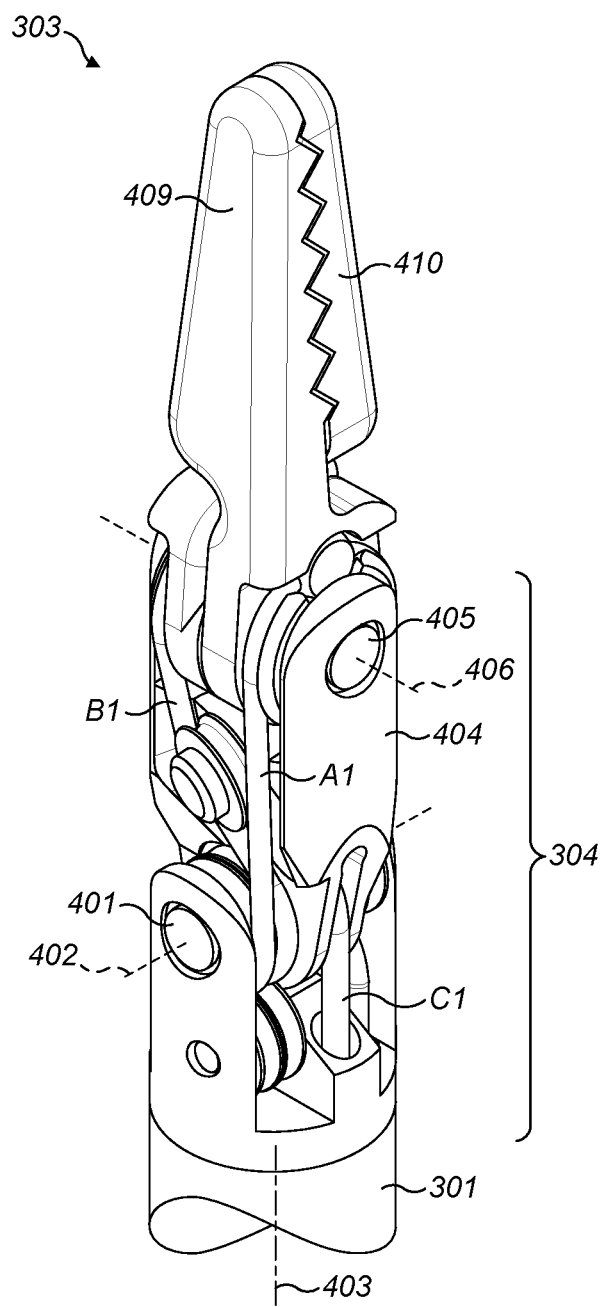

FIGS. 4a and 4b illustrate the distal end of an exemplary instrument which has a pair of jaws as the end effector 303. The shaft 301 is connected to the end effector 303 by articulation 304. The articulation 304 comprises several joints. These joints enable the pose of the end effector to be altered relative to the direction of the instrument shaft. Although not shown in FIGS. 4a and 4b, the end effector may also comprise joint(s). In the example of FIGS. 4a and 4b, the articulation 304 comprises a pitch joint 401. The pitch joint 401 rotates about pitch axis 402, which is perpendicular to the longitudinal axis 403 of the shaft 301. The pitch joint 401 permits a supporting body 404 (described below) and hence the end effector 303 to rotate about the pitch axis 402 relative to the shaft. In the example of FIGS. 4a and 4b, the articulation also comprises a first yaw joint 405 and a second yaw joint 407. First yaw joint 405 rotates about first yaw axis 406. Second yaw joint 407 rotates about second yaw axis 408. Both yaw axes 406 and 408 are perpendicular to pitch axis 402. Yaw axes 406 and 408 may be parallel. Yaw axes 406 and 408 may be collinear. The articulation 304 comprises a supporting body 404. At one end, the supporting body 404 is connected to the shaft 301 by pitch joint 401. At its other end, the supporting body 404 is connected to the end effector 303 by the yaw joints 405 and 407. This supporting body is omitted from FIG. 4a for ease of illustration so as to enable the other structure of the articulation to be more easily seen.

The end effector 303 shown comprises two end effector elements 409, 410. Alternatively, the end effector may have a single end effector element. The end effector elements 409, 410 shown in FIGS. 4a and 4b are opposing jaws. However, the end effector elements may be any type of opposing end effector elements. The first yaw joint 405 is fast with the first end effector element 409 and permits the first end effector element 409 to rotate about the first yaw axis 406 relative to the supporting body 404 and the pitch joint 401. The second yaw joint 407 is fast with the second end effector element 410 and permits the second end effector element 410 to rotate about the second yaw axis 408 relative to the supporting body 404 and the pitch joint 401. In FIGS. 4a and 4b, the end effector elements 409, 410 are shown in a closed configuration in which the jaws abut.

The joints illustrated in FIGS. 4a and 4b are driven by pairs of driving elements. These driving elements run through the shaft from the instrument interface to the articulation. The driving elements are elongate. They are flexible transverse to their longitudinal extent. They resist compression and/or tension forces along their longitudinal extent. A first pair of driving elements A1, A2 are constrained to move around the first yaw joint 405. Driving elements A1, A2 drive rotation of the first end effector element 409 about the first yaw axis 406. FIGS. 4a and 4b illustrate a second pair of driving elements B1, B2 which are constrained to move around the second yaw joint 407. Driving elements B1, B2 drive rotation of the second end effector element 410 about the second yaw axis 408. FIGS. 4a and 4b also illustrate a third pair of driving elements C1, C2 which are constrained to move around pitch joint 401. Driving elements C1, C2 drive rotation of the end effector 303 about the pitch axis 402. The end effector 303 can be rotated about the pitch axis 402 by applying tension to driving elements C1 and/or C2. The pitch joint 401 and yaw joints 405, 407 are independently driven by their respective driving elements. In the example of FIGS. 4a and 4b, there are three pairs of driving elements driving the joints of the articulation. In alternative examples, there may be only two pairs of driving elements driving the joints of the articulation.

Several sets of engageable instrument interface and drive assembly interface examples will now be described. Each of the described drive assembly interfaces is suitable for being attached to the terminal end of the robot arm described above and for driving each of the described instruments via its engagement with the corresponding instrument interface. Each of the described instrument interfaces is suitable for being attached to the proximal end of any of the instruments described herein and for driving articulation of the end effector of the instrument via the described driving elements when driven itself via its engagement with the corresponding drive assembly interface.

Figure 5:
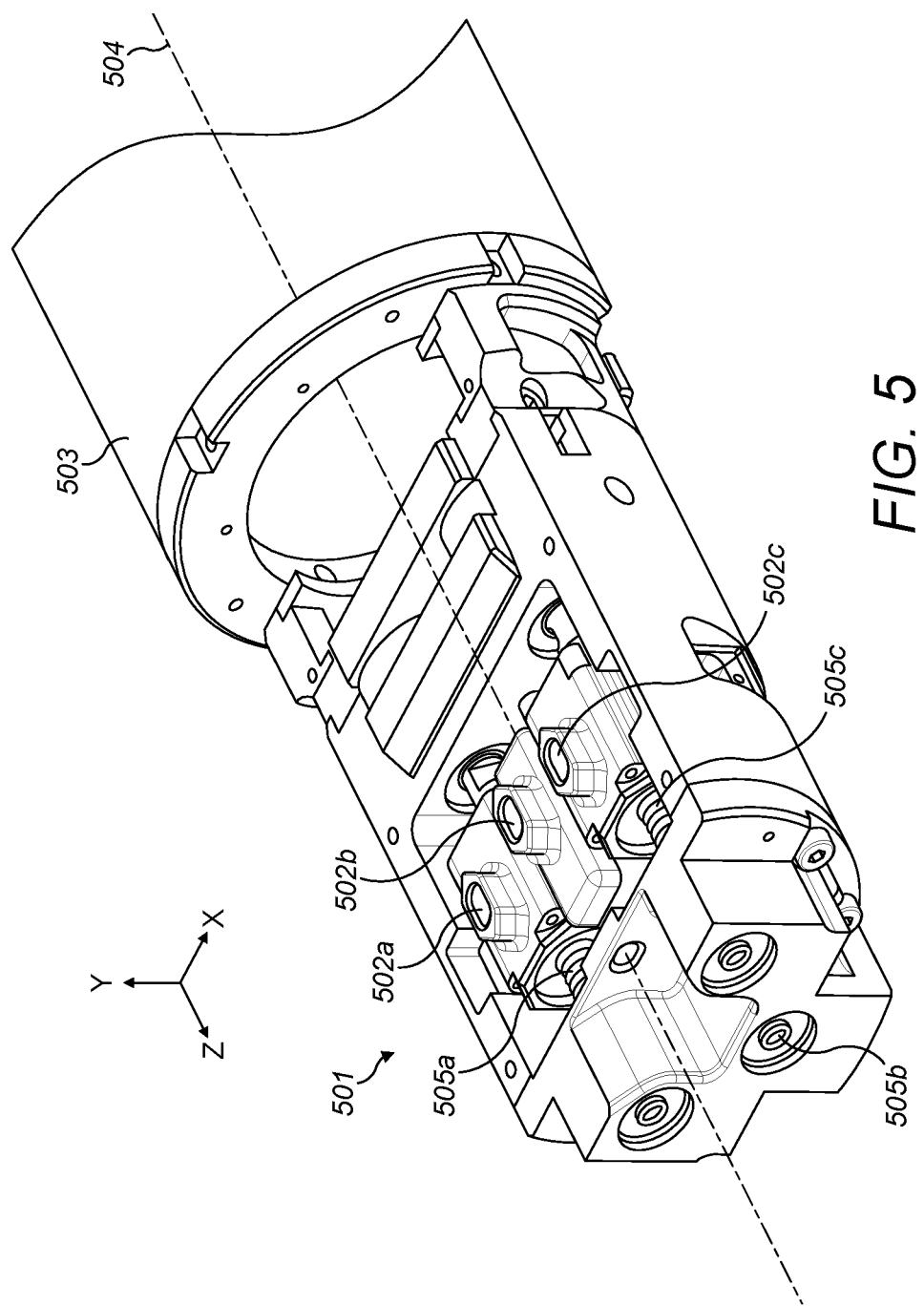
FIG. 5 illustrates a drive assembly interface having drive assembly interface elements arranged in a plane parallel to the longitudinal axis of the terminal link of the robot arm.
Figure 6:
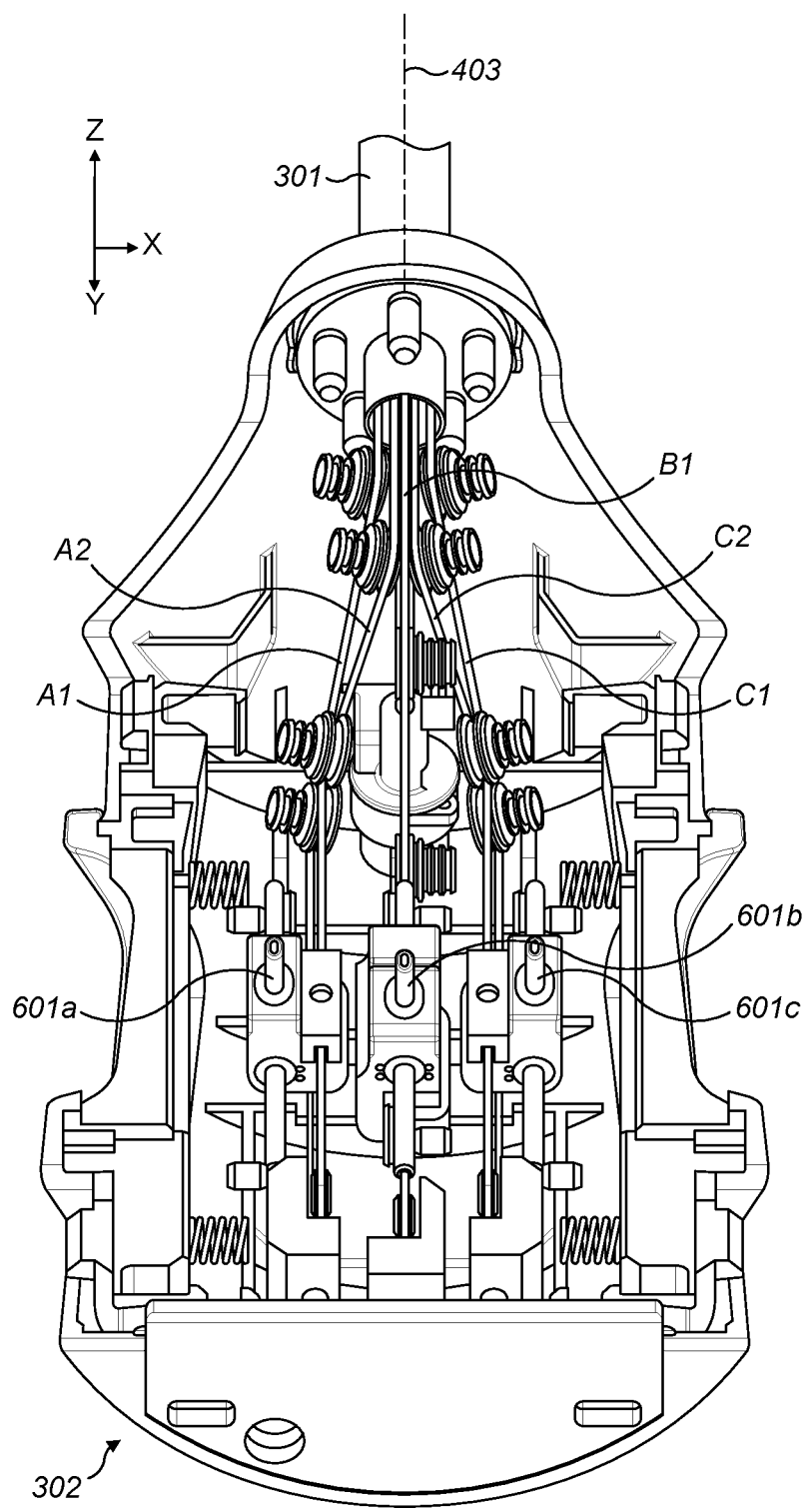
FIG. 6 illustrates an instrument interface configured to engage the drive assembly interface of FIG. 5.

FIGS. 5 and 6 illustrate a first engageable instrument interface 302 and drive assembly interface 501 set. Covers of the instrument interface 302 and drive assembly interface 501 set are not shown in FIGS. 5 and 6. The drive assembly interface, shown in FIG. 5, is attached to the terminal link 503 of the robot arm. The drive assembly interface 501 comprises a plurality of drive assembly interface elements 502a, 502b, 502c. FIG. 5 illustrates three drive assembly interface elements. These drive assembly interface elements all lie in the same plane parallel to the longitudinal axis 504 of the terminal link of the robot arm. Each drive assembly interface element is moveable within the drive assembly interface. Each drive assembly interface element is displaceable parallel to the longitudinal axis of the terminal link of the robot arm. In this example, each drive assembly interface element is driven along its range of motion by a lead screw with which it is in threaded engagement. Each lead screw is in turn driven by a motor in the robot arm. Thus, each drive assembly interface element moves parallel to the other drive assembly interface elements in the same plane parallel to the longitudinal axis 504 of the terminal link of the robot arm.

FIG. 6 illustrates an instrument interface 302 configured to engage with the drive assembly interface of FIG. 5. The instrument interface 302 is attached to the shaft 301 of the instrument. The instrument interface 302 comprises a plurality of instrument interface elements 601a, 601b, 601c. FIG. 6 illustrates three instrument interface elements. Each instrument interface element is attached to a pair of the driving elements A1, A2, B1, B2, C1, C2 (although it is noted that the driving element B2 is not visible in FIG. 6). The instrument interface elements 601a, 601b, 601c all lie in the same plane parallel to the longitudinal axis 403 of the shaft 301 of the instrument. Each instrument interface element is moveable within the instrument interface. Each instrument interface element is displaceable parallel to the longitudinal axis of the instrument shaft, thereby displacing the attached driving element. Each instrument interface element moves parallel to the other instrument interface elements in the same plane parallel to the longitudinal axis 403 of the shaft 301 of the instrument.

A robotic surgical instrument having the instrument interface of FIG. 6 engages a surgical robot arm having the drive assembly interface of FIG. 5 in a direction Y perpendicular to the longitudinal axes of the terminal link 504 of the robot arm and the instrument shaft 403. When the robot arm and instrument are engaged, the longitudinal axis of the terminal link 504 of the robot arm is parallel to the longitudinal axis 403 of the instrument shaft. The longitudinal axis of the terminal link 504 of the robot arm may be aligned with the longitudinal axis 403 of the instrument shaft. When the robotic surgical instrument engages the surgical robot arm, instrument interface element 601a engages drive assembly interface element 502a, instrument interface element 601b engages drive assembly interface element 502b, and instrument interface element 601c engages drive assembly interface element 502c. As each drive assembly interface element moves relative to the drive assembly interface across its range of motion it transfers drive to the instrument interface element it is engaged with. That instrument interface element thus moves relative to the instrument interface across its range of motion thereby transferring drive to its attached pair of driving elements.

In the example of FIGS. 5 and 6, the drive assembly interface elements are arranged in the same XZ plane perpendicular to the direction Y of instrument/robot arm engagement/disengagement. Similarly, the instrument interface elements are arranged in the same XZ plane perpendicular to the direction Y of instrument/robot arm engagement/disengagement. This enables the instrument to be detached from the robot arm independently of the position of each instrument interface element/drive assembly interface element in its range of motion. Thus, neither the robot arm nor the instrument needs to adopt a specific detachment configuration in order to enable the robot arm and instrument to be detached. Further, it is not necessary to move the instrument interface elements or drive assembly interface elements to enable the robot arm and instrument to be detached. When the instrument is attached to the arm (via the drive assembly interface and the instrument interface), a locking mechanism (e.g. a latch, a screw, etc.) may be used to maintain the engagement between the drive assembly interface and the instrument interface. A user is able to engage the locking mechanism and disengage the locking mechanism. When the instrument is to be detached from the arm, the user disengages the locking mechanism, e.g. by pressing springed latches, so that the instrument can then be detached from the arm by moving it in the detachment direction (i.e. in the Y direction).

However, the range of motion of each drive assembly interface element of FIG. 5 is parallel to the longitudinal axis of the terminal link of the robot arm. As such, the drive assembly interface of FIG. 5 has a length in the direction of the longitudinal axis of the terminal link of the robot arm sufficient to drive the drive assembly interface elements over their ranges of motion. The longer the robot arm, the greater stiffness and hence weight required along its length to provide the required precision of movement at the end effector of the attached instrument. Thus, reducing the length of the drive assembly interface in the direction of the longitudinal axis of the terminal link of the robot arm is desirable. Furthermore, reducing the length of the drive assembly means that the wrist joints of the arm (e.g. joints 205f and 205g) can be positioned closer to the surgical site (i.e. closer to the virtual pivot point), which is advantageous for increasing the workspace and maneuverability of the robot. As described above, the instrument pivots about the virtual pivot point which constrains the movement of the arm.

In a modification to the example of FIGS. 5 and 6, the drive assembly interface elements may lie in different planes which are parallel to each other and the XZ plane. In this modified example, the instrument interface elements would also lie in different planes which are parallel to each other and the XZ plane. The planes of the instrument interface elements would be complimentary to those of the drive assembly interface elements, such that when the instrument is engaged with the robot arm, each corresponding instrument interface element and drive assembly interface element pair engage with each other such that the drive assembly interface element can transfer drive to the instrument interface element along a direction parallel to the longitudinal axis of the terminal link of the robot arm and parallel to the longitudinal axis of the instrument shaft. In this modified example, the instrument still detaches from the robot arm in the direction Y perpendicular to the longitudinal axes of the terminal link of the robot arm and the instrument shaft. The drive assembly interface elements and instrument interface elements are still distributed across the XZ plane such that the instrument can be detached from the robot arm when each individual drive assembly interface element/instrument interface element is anywhere within its range of motion. Thus, neither the robot arm nor the instrument needs to adopt a specific detachment configuration in order to enable the robot arm and instrument to be detached. Further, it is not necessary for any drive assembly interface element or instrument interface element to move when detaching the instrument from the robot arm. In other words, the instrument is detachable without moving the instrument interface elements. There is therefore no transfer of drive to the end effector when detaching the instrument from the robot arm, and so the end effector does not move when detaching the instrument from the robot arm.

The following examples of engageable instrument interfaces and drive assembly interfaces each have drive assembly interface elements arranged across a plane perpendicular to the longitudinal axis of the terminal link of the robot arm, and instrument interface elements arranged across a plane or planes perpendicular to the longitudinal axis of the instrument shaft. Each instrument detaches from the robot arm in a direction perpendicular to the longitudinal axes of the terminal link of the robot arm and instrument shaft. Thus, the drive assembly interface elements are arranged across a plane which is parallel to the direction of detachment of the instrument and robot arm. Similarly, the instrument interface elements are arranged across a plane which is parallel to the direction of detachment of the instrument and robot arm.

Figure 7:
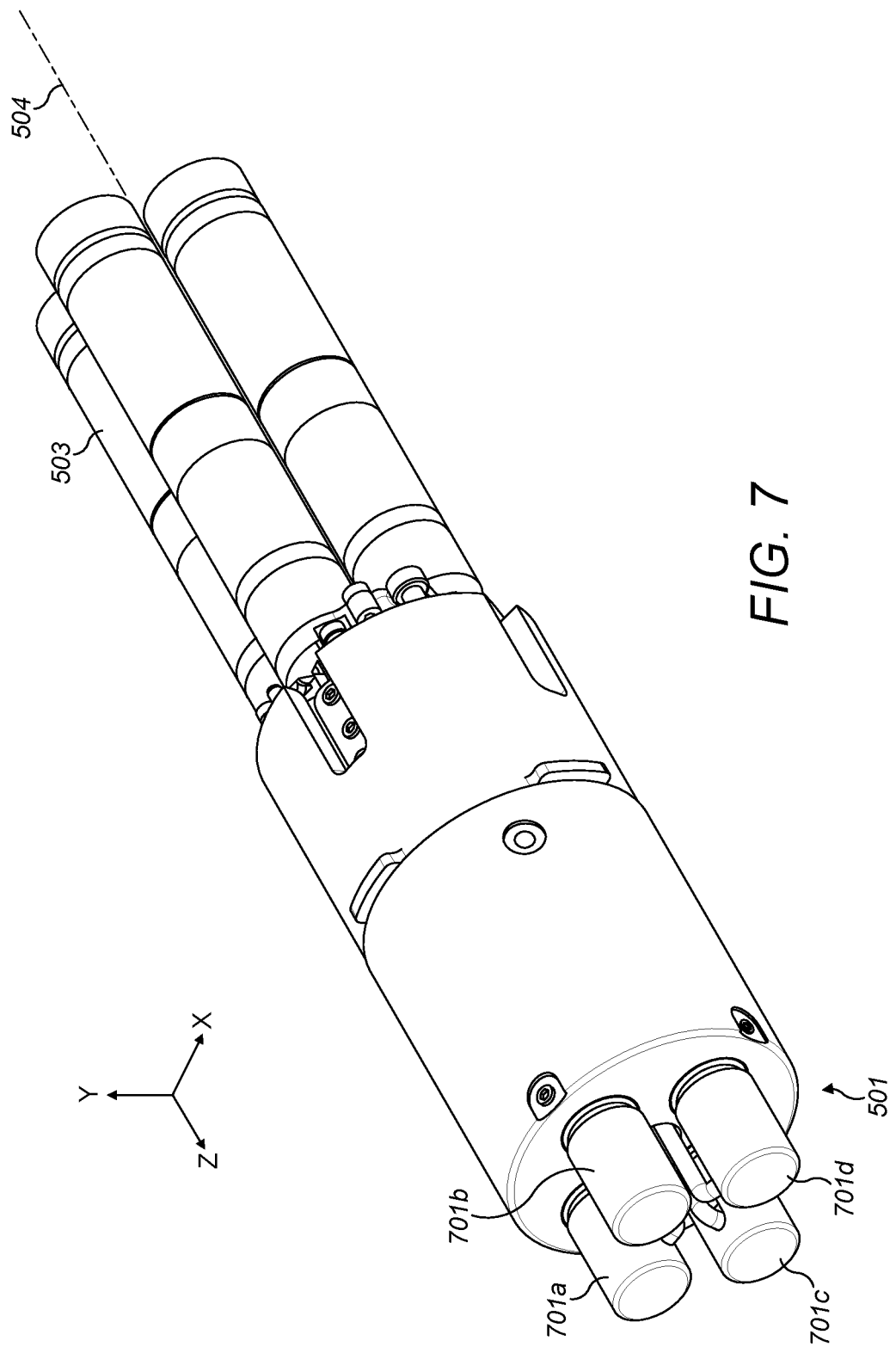
FIG. 7 illustrates a drive assembly interface having drive assembly interface elements arranged in a plane perpendicular to the longitudinal axis of the terminal link of the robot arm.
Figure 8:
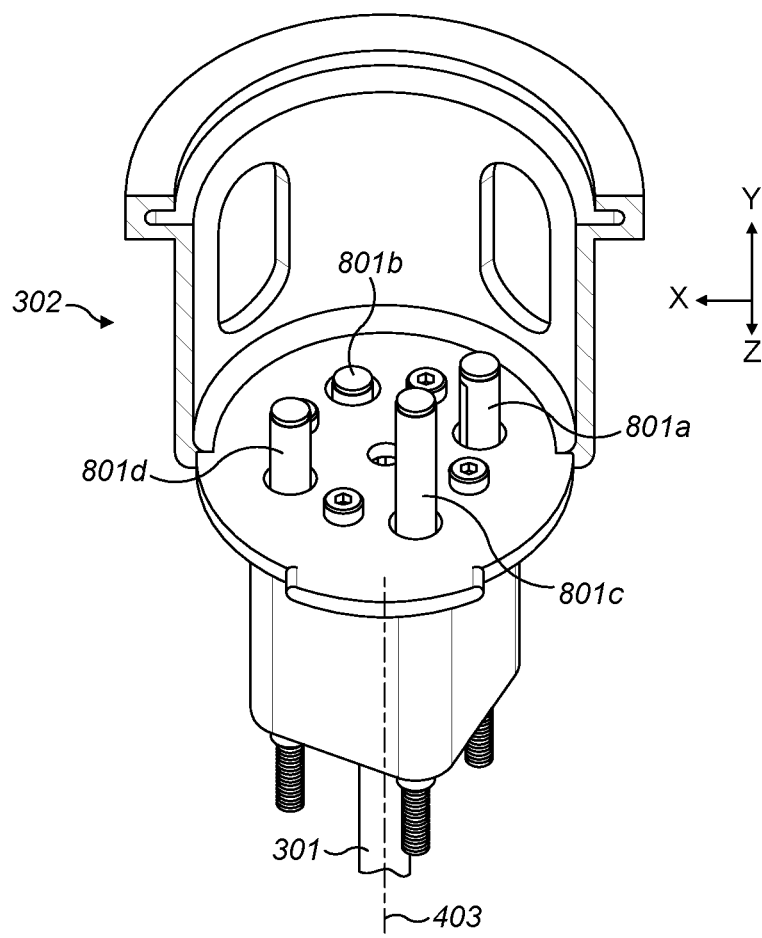
FIG. 8 illustrates an instrument interface configured to engage the drive assembly interface of FIG. 7.

FIGS. 7 and 8 illustrate a further engageable instrument interface 302 and drive assembly interface 501 set. The drive assembly interface, shown in FIG. 7, is attached to the terminal link 503 of the robot arm. The drive assembly interface 501 comprises a plurality of drive assembly interface elements 701a, 701b, 701c, 701d. FIG. 7 illustrates four drive assembly interface elements. These drive assembly interface elements all lie in the same plane perpendicular to the longitudinal axis 504 of the terminal link of the robot arm. This is the XY plane shown in FIG. 7, where Z is the direction of the longitudinal axis 504 of the terminal link of the robot arm. The drive assembly interface elements are distributed across the XY plane such that there are two upper drive assembly interface elements 701a, 701b and two lower drive assembly interface elements 701c, 701d. Each drive assembly interface element is moveable within the drive assembly interface. Each drive assembly interface element is a push rod which is displaceable parallel to the longitudinal axis 504 of the terminal link of the robot arm. Each push rod is driven along its range of motion by a motor in the robot arm. Thus, each drive assembly interface element moves parallel to the other drive assembly interface elements in a direction which is perpendicular to the XY plane on which all the drive assembly interface elements lie.

FIG. 8 illustrates an instrument interface 302 configured to engage with the drive assembly interface of FIG. 7. The instrument interface 302 is attached to the shaft 301 of the instrument. The instrument interface 302 comprises a plurality of instrument interface elements 801a, 801b, 801c, 801d. FIG. 8 illustrates four instrument interface elements. Each instrument interface element is attached to a driving element for driving one or more joints of the articulation of an instrument. The instrument interface elements 801a, 801b, 801c, 801d all lie in the same plane perpendicular to the longitudinal axis 403 of the shaft 301 of the instrument. The instrument interface elements are distributed across the XY plane such that there are two upper instrument interface elements 801a, 801b and two lower instrument interface elements 801c, 801d. Each instrument interface element is moveable within the instrument interface. Each instrument interface element is displaceable parallel to the longitudinal axis of the instrument shaft, thereby displacing the attached driving element. Each instrument interface element moves parallel to the other instrument interface elements in a direction which is perpendicular to the XY plane on which all the instrument interface elements lie. In FIG. 8, the instrument interface elements are push rods.

A robotic surgical instrument having the instrument interface of FIG. 8 engages a surgical robot arm having the drive assembly interface of FIG. 7 in a direction Y perpendicular to the longitudinal axes of the terminal link 504 of the robot arm and the instrument shaft 403. When the robot arm and instrument are engaged, the longitudinal axis of the terminal link 504 of the robot arm is parallel to the longitudinal axis 403 of the instrument shaft. The longitudinal axis of the terminal link 504 of the robot arm may be aligned with the longitudinal axis 403 of the instrument shaft. The arrangement of the instrument interface elements across the instrument interface in the XY plane matches the arrangement of the drive assembly interface elements across the drive assembly interface in the XY plane. Thus, when the robotic surgical instrument engages the surgical robot arm, instrument interface element 801a engages drive assembly interface element 701a, instrument interface element 801b engages drive assembly interface element 701b, instrument interface element 801c engages drive assembly interface element 701c, and instrument interface element 801d engages drive assembly interface element 701d. Specifically, the exposed end of each push rod of the drive assembly interface contacts the exposed end of the corresponding push rod of the instrument interface. This contact is such that the push rod of the drive assembly interface is aligned with the push rod of the instrument interface. They are thus in a driving engagement, such that as the push rod of the drive assembly interface is pushed relative to the drive assembly interface across its range of motion it pushes the push rod of the instrument interface it is engaged with. This provides an efficient and direct force transfer from the robot arm to the instrument. The push rod of the instrument interface thus moves relative to the instrument interface across its range of motion thereby transferring drive to its attached driving element.

In the example of FIGS. 7 and 8, the drive assembly interface elements are arranged in the same XY plane parallel to the direction Y of instrument/robot arm engagement/disengagement. Similarly, the instrument interface elements are arranged in the same XY plane parallel to the direction Y of instrument/robot arm engagement/disengagement. The drive assembly interface elements are distributed in the X direction, i.e. perpendicular to both the detachment direction Y and the longitudinal axis 504 of the terminal link of the robot arm Z, such that they are not overlapping in the X direction. In other words, the drive assembly interface elements are arranged such that, when viewed along the detachment direction Y, they do not appear to overlap. To put it another way, the positions of the drive assembly interface elements have non-overlapping components in the X direction. Similarly, the instrument interface elements are distributed in the X direction, i.e. perpendicular to both the detachment direction Y and the longitudinal axis 403 of the instrument shaft Z, such that they are not overlapping in the X direction. In other words, the instrument interface elements are arranged such that, when viewed along the detachment direction Y, they do not appear to overlap. To put it another way, the positions of the instrument interface elements have non-overlapping components in the X direction. This ensures that the instrument can be detached from the robot arm by moving the instrument relative to the arm in the detachment direction Y, wherever each individual drive assembly interface element and instrument interface element is within its range of motion. In other words, the instrument can be detached from the robot arm independently of the position of each instrument interface element/drive assembly interface element in its range of motion. Thus, neither the robot arm nor the instrument needs to adopt a specific detachment configuration in order to enable the robot arm and instrument to be detached. Further, it is not necessary to move the instrument interface elements or drive assembly interface elements to enable the instrument to be detached from the robot arm.

Figure 9:
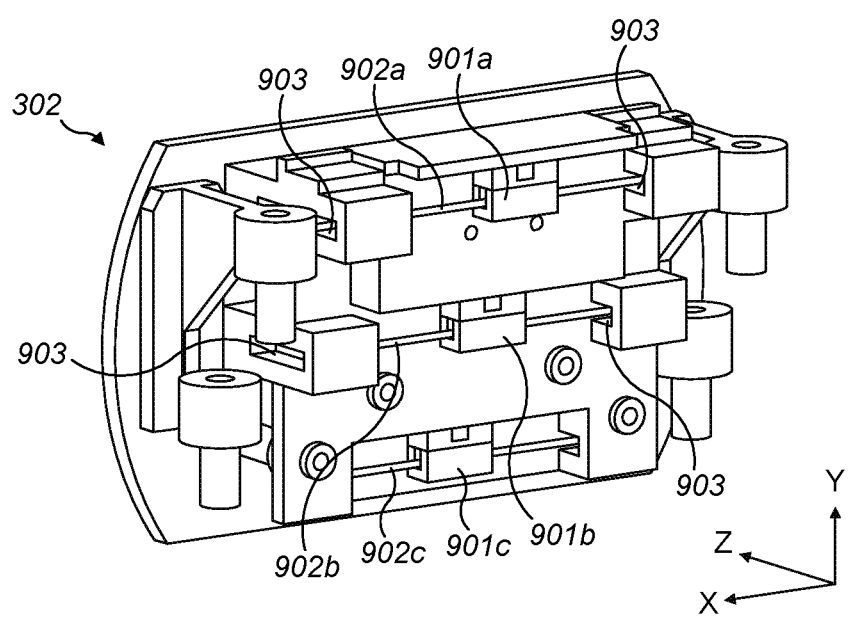
FIG. 9 illustrates an instrument interface configured to engage the drive assembly interface of FIG. 11.
Figure 10:
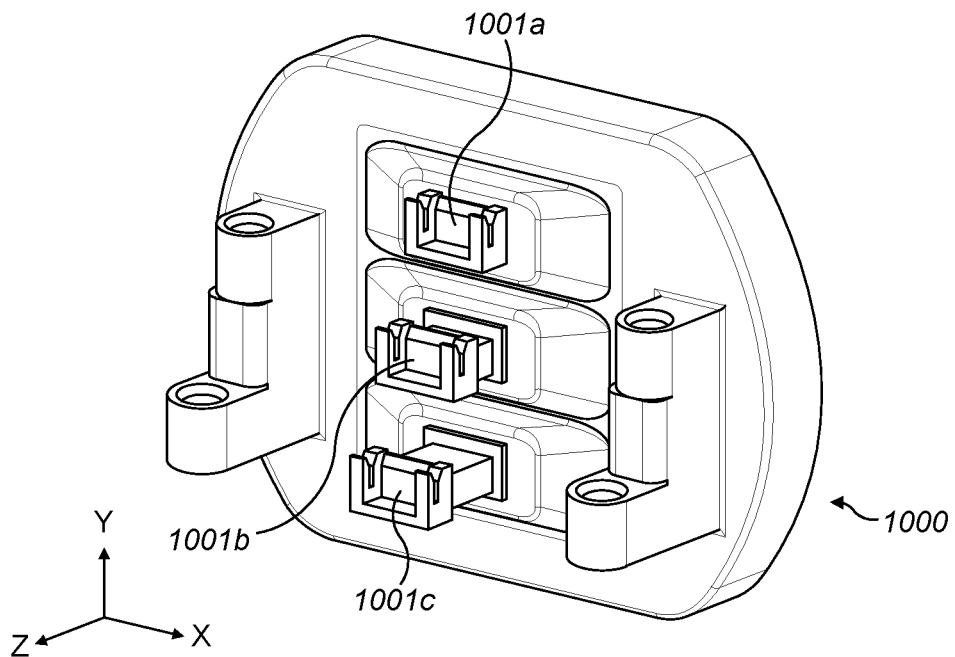
FIG. 10 illustrates a sterile barrier configured to intersperse the instrument interface of FIG. 9 and the drive assembly interface of FIG. 11.
Figure 11:
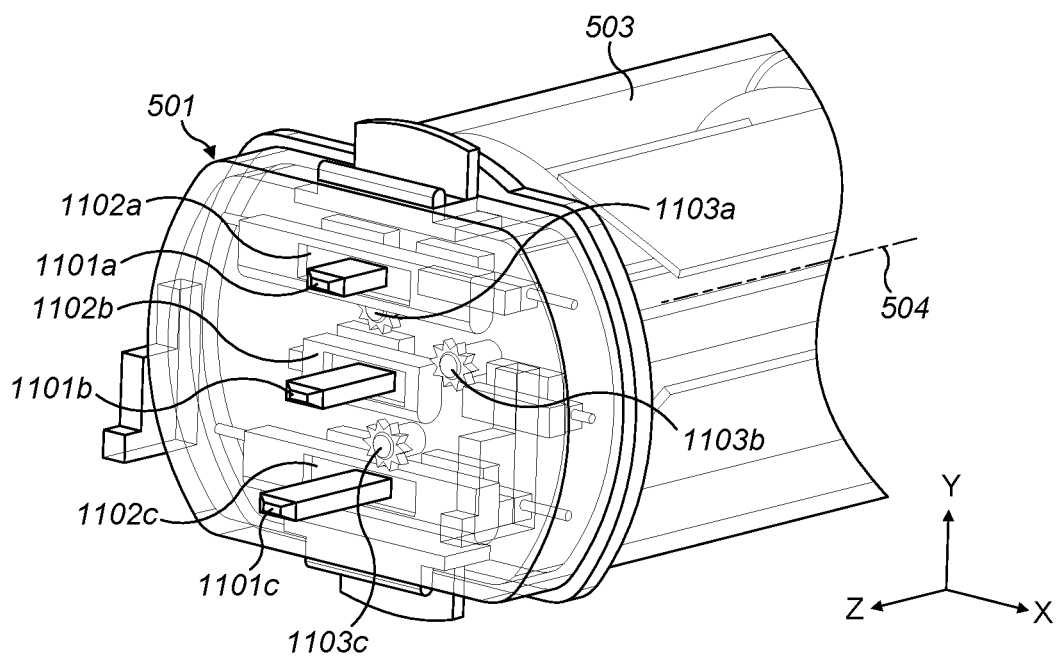
FIG. 11 illustrates a drive assembly interface having drive assembly interface elements arranged and moveable in a plane perpendicular to the longitudinal axis of the terminal link of the robot arm.

FIGS. 9 and 11 illustrate a further engageable instrument interface 302 and drive assembly interface 501 set. FIG. 10 illustrates a sterile barrier which fits between the instrument interface shown in FIG. 9 and the drive assembly interface shown in FIG. 11 to isolate the sterile instrument from the non-sterile robot arm. The drive assembly interface is attached to the terminal link 503 of the robot arm. The drive assembly interface 501 comprises a plurality of drive assembly interface elements 1101a, 1101b, 1101c. FIG. 11 illustrates three drive assembly interface elements. These drive assembly interface elements lie in a stepped configuration on a plane perpendicular to the longitudinal axis 504 of the terminal link of the robot arm. This is the XY plane shown in FIG. 11, where Z is the direction of the longitudinal axis 504 of the terminal link of the robot arm and Y is the direction of detachment of the instrument and robot arm. The drive assembly interface elements are distributed across the XY plane in a stacked configuration. They are offset from each other in the Y direction. When the drive assembly interface elements are each at the centre of their ranges of motion, they are aligned in the X direction.

Each drive assembly interface element of FIG. 11 is moveable within the drive assembly interface. Each drive assembly interface element moves relative to the drive assembly interface in a direction perpendicular to the longitudinal axis of the terminal link 504, i.e. in the XY plane in which all the drive assembly interface elements lie. Each drive assembly interface element moves relative to the drive assembly interface in a direction perpendicular to the detachment direction Y. In other words, each drive assembly interface element moves in the X direction. Each drive assembly interface element moves parallel to the other drive assembly interface elements. The drive assembly interface elements may be driven to displace along their ranges of motion in the X direction by any suitable means. FIG. 11 illustrates each drive assembly interface element being driven by a rack and pinion drive. Each drive assembly interface element 1101a, 1101b, 1101c is fixedly attached to a respective rack 1102a, 1102b, 1102c in the drive assembly. Each rack extends along the X direction. Each rack 1102a, 1102b, 1102c engages a respective pinion 1103a, 1103b, 1103c. Each pinion is rotated by a driveshaft driven by a motor in the robot arm. Rotation of the pinion causes the rack to move linearly in the X direction, thereby causing the drive assembly interface element to displace linearly in the X direction.

The drive assembly interface elements of FIG. 11 terminate at different positions along the direction of the longitudinal axis 504 of the terminal link of the robot arm. This stepped configuration is more easily seen in FIG. 12 which shows a cross section of the drive assembly interface, sterile barrier and instrument interface when the three components are all engaged together. The drive assembly interface element 1101a terminates at a position u along the direction of the longitudinal axis 504, the drive assembly interface element 1101b terminates at a position v along the direction of the longitudinal axis 504, and the drive assembly interface element 1101c terminates at a position w along the direction of the longitudinal axis 504. u, v and w are all spaced along the direction of the longitudinal axis 504.

FIG. 9 illustrates an instrument interface 302 configured to engage with the drive assembly interface of FIG. 11 via the sterile barrier of FIG. 10. The instrument interface 302 is attached to the shaft 301 of the instrument (see FIG. 12). The instrument interface 302 comprises a plurality of instrument interface elements 901a, 901b, 901c. FIG. 9 illustrates three instrument interface elements. Each instrument interface element is attached to a driving element 902a, 902b, 902c for driving one or more joints of the articulation of an instrument. The instrument interface elements 901a, 901b, 901c lie in parallel planes perpendicular to the longitudinal axis 403 of the shaft 301 of the instrument. In other words, the instrument interface elements are spaced along the Z direction of the instrument shaft's longitudinal axis 403. This stepped configuration is more easily seen in FIG. 12. The instrument interface elements can be considered to be in a stepped arrangement on a plane (indicated by the dashed line 1202 in FIG. 12) that is perpendicular to the longitudinal axis 403 of the shaft of the instrument, such that each of the instrument interface elements (901a, 901b, 901c) are displaced from the plane 1202, in the Z direction, by a respective displacement magnitude. The displacement magnitude is larger for an instrument interface element which has a larger Y component value. In particular, the instrument interface element 901c with the smallest Y component value is displaced from the plane 1202 by a first displacement magnitude in a direction along the negative Z direction; the instrument interface element 901b with the middle Y component value is displaced from the plane 1202 by a second displacement magnitude in a direction along the negative Z direction, wherein the second displacement magnitude is greater than the first displacement magnitude; and the instrument interface element 901a with the largest Y component value is displaced from the plane 1202 by a third displacement magnitude in a direction along the negative Z direction, wherein the third displacement magnitude is greater than the second displacement magnitude. In this way, the instrument interface elements are distributed in a stacked configuration in the detachment direction Y of the instrument and robot arm. They are offset from each other in the Y direction. When the instrument interface elements are each at a particular position within their ranges of motion, they are aligned in a direction perpendicular to the X direction. When the instrument interface elements are each at the particular position within their ranges of motion, they are aligned in the X direction (i.e. their positions have the same components in the X direction), such that they all lie in the same plane that is perpendicular to the X direction, i.e. a plane that is parallel to the YZ plane. For example, the particular position within the range of motion of an instrument interface element may be the centre of its range of motion. In other examples, the particular position within the range of motion of an instrument interface element may be at a different distance from the travel limits of the instrument interface element. It is noted that a direction of alignment can be represented as a straight line which intersects with any portion (e.g. the centre) of the three instrument interface elements. When the instrument interface elements are all in the particular position the end effector may also be in a straight configuration. This may be useful because it can allow a user to determine whether the interface is in approximately the right configuration for the instrument to be detached from (or attached to) the arm by looking only at the end effector. This allows the interface elements to be positioned into approximately the right configuration by straightening the end effector. Furthermore, it may be easier (or possibly necessary) for the end effector to be straight in order for the instrument to be retracted through the port. In this case the control system may perform (only) one straightening operation to straighten the end effector before the instrument is retracted through the port which would also set the interface elements into the correct configuration for the instrument to be detached from the arm.

Each instrument interface element of FIG. 9 is moveable within the instrument interface. Each instrument interface element is displaceable perpendicular to the longitudinal axis of the instrument shaft along the X direction, thereby displacing its attached driving element. The attached driving element also displaces in a direction perpendicular to the longitudinal axis of the instrument shaft along the X direction where it attaches to the instrument interface element. The attached driving element is then routed down the instrument shaft 301 by a set of one or more pulleys 903. Each instrument interface element moves parallel to the other instrument interface elements in the X direction. The instrument interface elements move in non-overlapping planes perpendicular to the longitudinal axis of the shaft.

A robotic surgical instrument having the instrument interface of FIG. 9 engages a surgical robot arm having the drive assembly interface of FIG. 11 in a direction Y perpendicular to the longitudinal axes of the terminal link 504 of the robot arm and the instrument shaft 403. When the robot arm and instrument are engaged, the longitudinal axis of the terminal link 504 of the robot arm is parallel to the longitudinal axis 403 of the instrument shaft. The longitudinal axis of the terminal link 504 of the robot arm may be aligned with the longitudinal axis 403 of the instrument shaft. The distribution of drive assembly interface elements (when each at the centre of its range of motion) over the drive assembly interface in the XY plane matches the distribution of instrument interface elements (when each at the centre of its range of motion) over the instrument interface in the XY plane.

Figure 12:
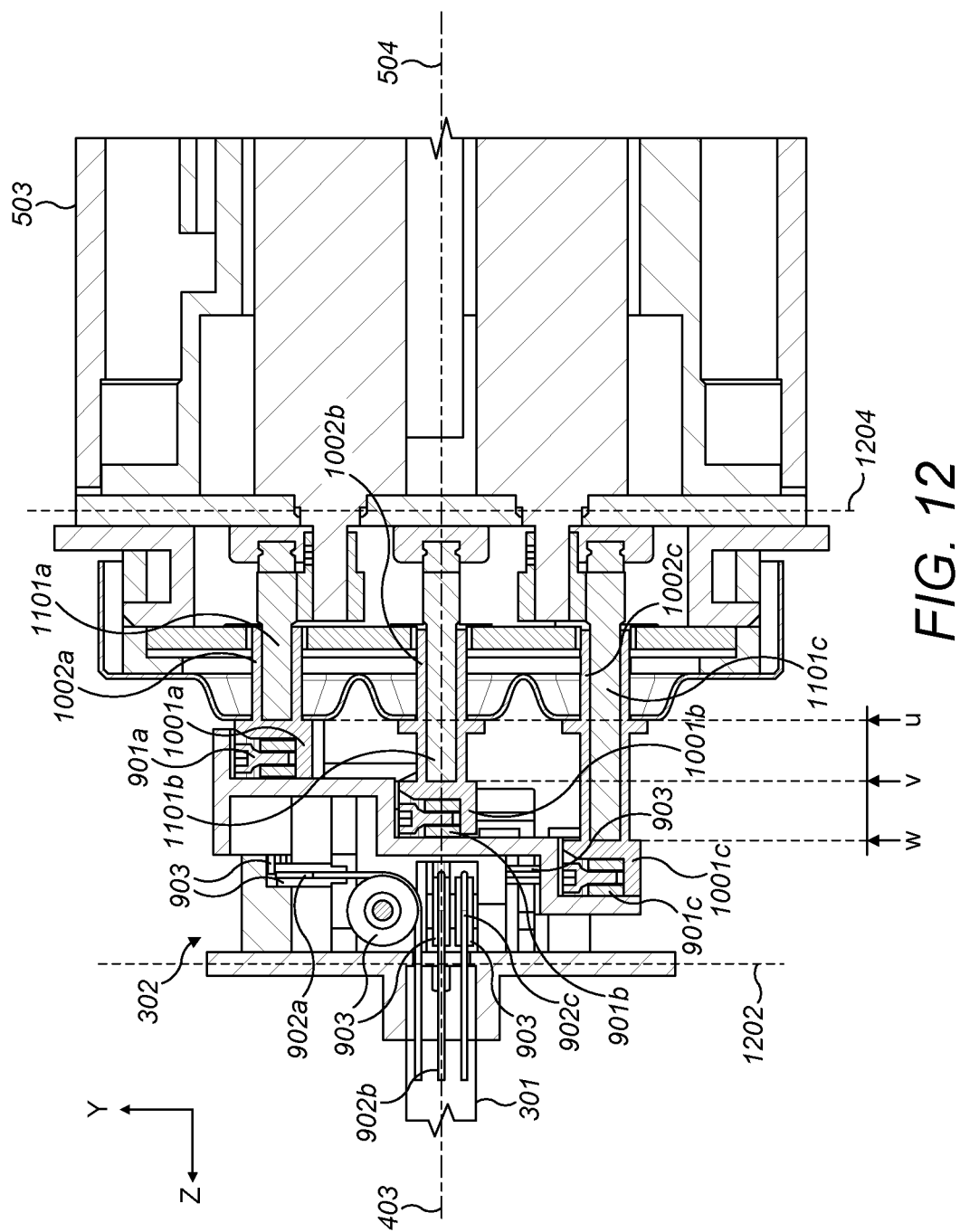
FIG. 12 illustrates the combination of the instrument interface of FIG. 9, the sterile barrier of FIG. 10 and the drive assembly interface of FIG. 11 when engaged together.

To engage the surgical instrument and robot arm, first, sterile barrier 1000 is engaged over drive assembly interface 501. As shown in FIG. 12, each drive assembly interface element 1101a, 1101b, 1101c slots into a respective cup 1002a, 1002b, 1002c on one side of the sterile barrier. Each instrument interface element 901a, 901b, 901c engages in a respective holder 1001a, 1001b, 1001c on the opposing side of the sterile barrier. Thus, when the robotic surgical instrument engages the surgical robot arm via the sterile barrier, instrument interface element 901a engages drive assembly interface element 1101a via holder 1001a and cup 1002a of the sterile barrier, instrument interface element 901b engages drive assembly interface element 1101b via holder 1001b and cup 1002b of the sterile barrier, and instrument interface element 901c engages drive assembly interface element 1101c via holder 1001c and cup 1002c of the sterile barrier. The drive assembly interface elements can be considered to be in a stepped arrangement on a plane (indicated by the dashed line 1204 in FIG. 12) that is perpendicular to the longitudinal axis 403 of the terminal link 504 of the robot arm, such that each of the drive assembly interface elements (1101a, 1101b, 1101c) are displaced from the plane 1204, in the Z direction, by a respective displacement magnitude. The displacement magnitude is smaller for a drive assembly interface element which has a larger Y component value. In particular, the drive assembly interface element 1101c with the smallest Y component value is displaced from the plane 1204 by a first displacement magnitude in a direction along the positive Z direction; the drive assembly interface element 1101b with the middle Y component value is displaced from the plane 1204 by a second displacement magnitude in a direction along the positive Z direction, wherein the second displacement magnitude is less than the first displacement magnitude; and the drive assembly interface element 1101a with the largest Y component value is displaced from the plane 1204 by a third displacement magnitude in a direction along the positive Z direction, wherein the third displacement magnitude is less than the second displacement magnitude. The spacing of the drive assembly interface elements along the X direction matches the spacing of the instrument interface elements along the X direction. Thus, when the instrument is engaged with the robot arm, each drive assembly interface element is in a driving engagement with its corresponding instrument interface element. Each cup 1002a, 1002b, 1002c and holder 1001a, 1001b, 1001c of the sterile barrier is linearly moveable along the X direction across the range of motion of the corresponding instrument interface element. Thus, as each drive assembly interface element is driven relative to the drive assembly interface across its range of motion it drives the instrument interface element it is engaged with via the sterile barrier. The instrument interface element thus moves relative to the instrument interface across its range of motion thereby transferring drive to its attached driving element.

Since the drive assembly interface elements and the instrument interface elements are spaced along the Z direction (due to the stepped arrangements described above), the instrument can be detached from the robot arm along the Y direction wherever each individual drive assembly interface element and instrument interface element is within its range of motion. In other words, the instrument can be detached from the robot arm independently of the position of each instrument interface element/drive assembly interface element in its range of motion. Thus, neither the robot arm nor the instrument needs to adopt a specific detachment configuration in order to enable the robot arm and instrument to be detached. Further, it is not necessary to move the instrument interface elements or drive assembly interface elements to enable the detachment of the instrument from the robot arm.

Figure 13:
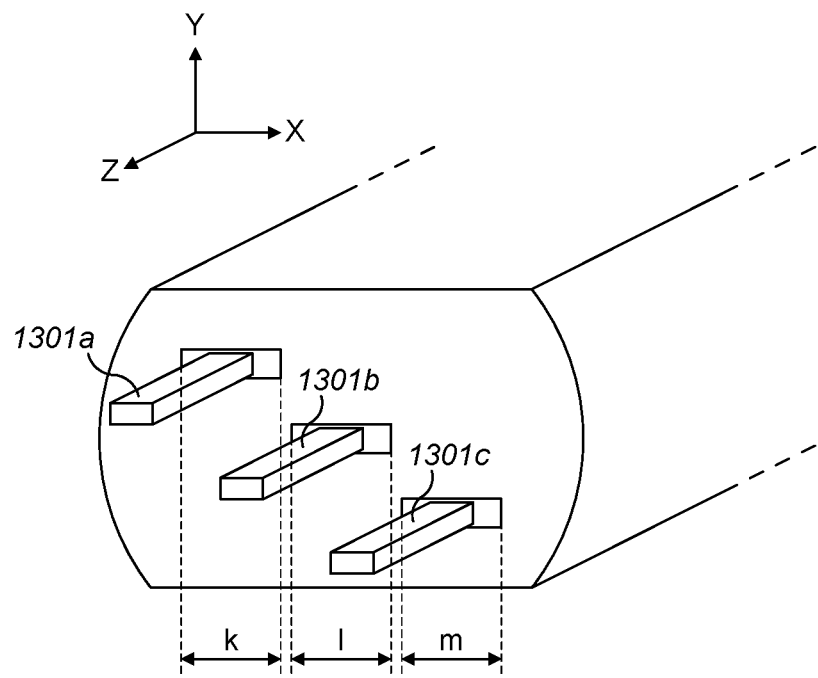
FIG. 13 illustrates a drive assembly interface having drive assembly interface elements arranged in a non-overlapping configuration in a plane perpendicular to the longitudinal axis of the terminal link of the robot arm.

FIG. 13 illustrates a modification to the example of FIGS. 9 to 12, in which the drive assembly interface elements 1301a, 1301b, 1301c are spaced along the X direction across their entire ranges of motion. Thus, wherever each drive assembly interface element is within its range of motion, it does not overlap with any other drive assembly interface element in the X direction wherever each of the other drive assembly interface elements is in its range of motion. In other words, wherever each drive assembly interface element is within its range of motion, when viewed along the detachment direction Y the drive assembly interface elements do not appear to overlap with each other. To put it another way, the positions of the drive assembly interface elements have non-overlapping components in the X direction, wherever there are within their ranges of motion. As illustrated on FIG. 13, the ranges of motion k, l, m of drive assembly interface elements 1301a, 1301b, 1301c respectively are non-overlapping in the X direction. The drive assembly interface elements may be driven by rack and pinion drives as described with respect to FIGS. 9 to 12. The cups and holders of the corresponding sterile barrier (not shown), and the instrument interface elements of the corresponding instrument interface (not shown) are also distributed across the XY plane so as to match the distribution of the drive assembly interface elements. In this example, neither the drive assembly interface elements, nor the cups and holders of the sterile barrier, nor the instrument interface elements are arranged in a spaced arrangement along the Z direction. Thus, all of the drive assembly interface elements move on the same XY plane perpendicular to the longitudinal axis of the terminal link of the robot arm. Similarly, all of the instrument interface elements move on the same XY plane perpendicular to the longitudinal axis of the instrument shaft. Since the drive assembly interface elements and the instrument interface elements are spaced along the X direction, the instrument can be detached from the robot arm along the Y direction wherever each individual drive assembly interface element and instrument interface element is within its range of motion. In other words, the instrument can be detached from the robot arm independently of the position of each instrument interface element/drive assembly interface element in its range of motion. Thus, neither the robot arm nor the instrument needs to adopt a specific detachment configuration in order to enable the robot arm and instrument to be detached. Further, it is not necessary to move the instrument interface elements or drive assembly interface elements when detaching the instrument from the robot arm.

Figure 14:
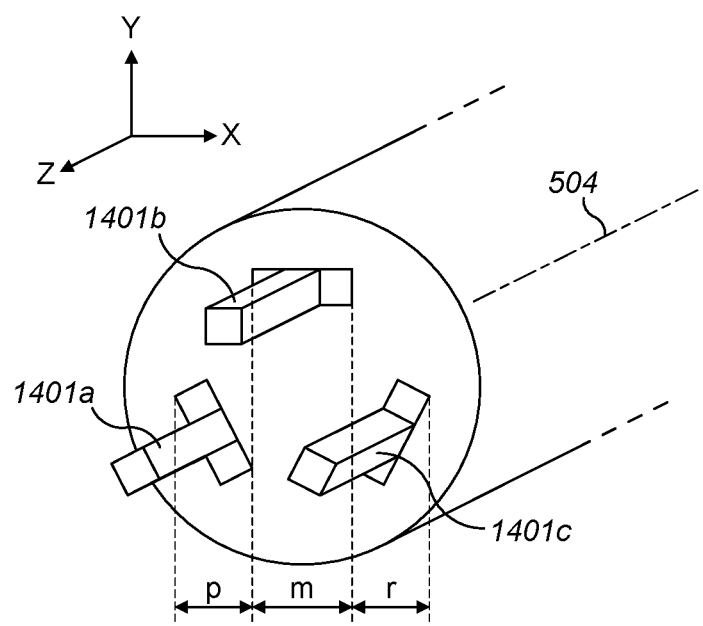
FIG. 14 illustrates a drive assembly interface having drive assembly interface elements arranged to move in non-parallel directions in a plane perpendicular to the longitudinal axis of the terminal link of the robot arm.

FIG. 14 illustrates another modification to the example of FIGS. 9 to 12, in which the drive assembly interface elements 1401a, 1401b, 1401c move linearly but in non-parallel directions relative to each other. The drive assembly interface elements 1401a, 1401b, 1401c are spaced along the X direction across their entire range of motions. Thus, wherever each drive assembly interface element is within its range of motion, it does not overlap with any other drive assembly interface element in the X direction wherever each of the other drive assembly interface elements is in its range of motion. In other words, wherever each drive assembly interface element is within its range of motion, when viewed along the detachment direction Y the drive assembly interface elements do not appear to overlap with each other. To put it another way, the positions of the drive assembly interface elements have non-overlapping components in the X direction, wherever there are within their ranges of motion. As illustrated on FIG. 14, the ranges of motion p, q, r of drive assembly interface elements 1401a, 1401b, 1401c respectively are non-overlapping in the X direction. The drive assembly interface elements may be driven by rack and pinion drives as described with respect to FIGS. 9 to 12. The cups and holders of the corresponding sterile barrier, and the instrument interface elements of the corresponding instrument interface are also distributed across the XY plane so as to match the distribution of the drive assembly interface elements. In this example, neither the drive assembly interface elements, nor the cups and holders of the sterile barrier, nor the instrument interface elements are arranged in a spaced arrangement along the Z direction. Thus, all of the drive assembly interface elements move on the same XY plane perpendicular to the longitudinal axis of the terminal link of the robot arm. Similarly, all of the instrument interface elements move on the same XY plane perpendicular to the longitudinal axis of the instrument shaft. Since the drive assembly interface elements and the instrument interface elements are spaced along the X direction, the instrument can be detached from the robot arm along the Y direction wherever each individual drive assembly interface element and instrument interface element is within its range of motion. In other words, the instrument can be detached from the robot arm independently of the position of each instrument interface element/drive assembly interface element in its range of motion. Thus, neither the robot arm nor the instrument needs to adopt a specific detachment configuration in order to enable the robot arm and instrument to be detached. Further, it is not necessary to move the instrument interface elements or drive assembly interface elements when detaching the instrument from the robot arm.

The examples of FIGS. 9 to 14 all have drive assembly interface elements which are driven to move in the XY plane which is perpendicular to the longitudinal axis of the terminal link of the robot arm. Thus, the drive assembly interfaces of these examples are more compact in the direction of the longitudinal axis of the terminal link. This reduces the length of the robot arm compared to the examples of FIGS. 5 to 8. As described above, reducing the length of the robot arm reduces the stiffness and hence weight required along its length to provide the required precision of movement at the end effector of the attached instrument. Furthermore, reducing the length of the drive assembly means that the wrist joints of the arm (e.g. joints 205f and 205g) can be positioned closer to the surgical site (i.e. closer to the virtual pivot point), which is advantageous for increasing the workspace and maneuverability of the robot.

Figure 15:
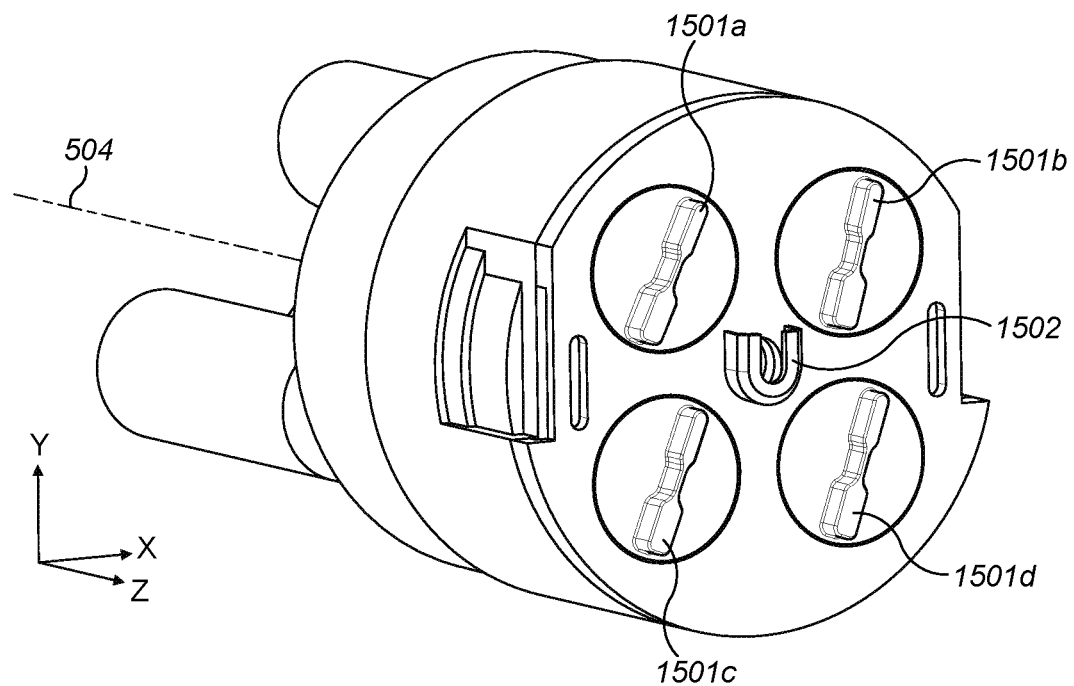
FIG. 15 shows a perspective view of a drive assembly interface of a terminal link of a robot arm.
Figure 16:
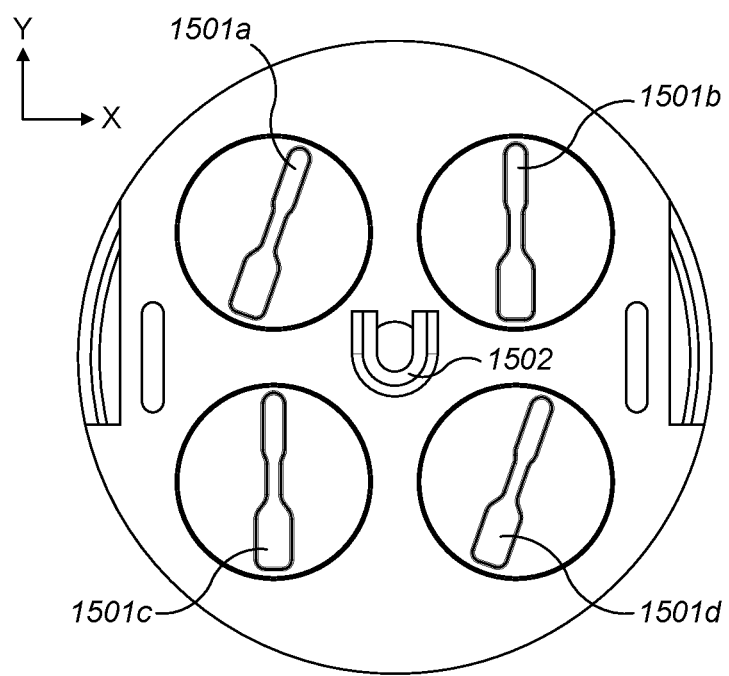
FIG. 16 shows a front view of the drive assembly interface shown in FIG. 15.
Figure 17:
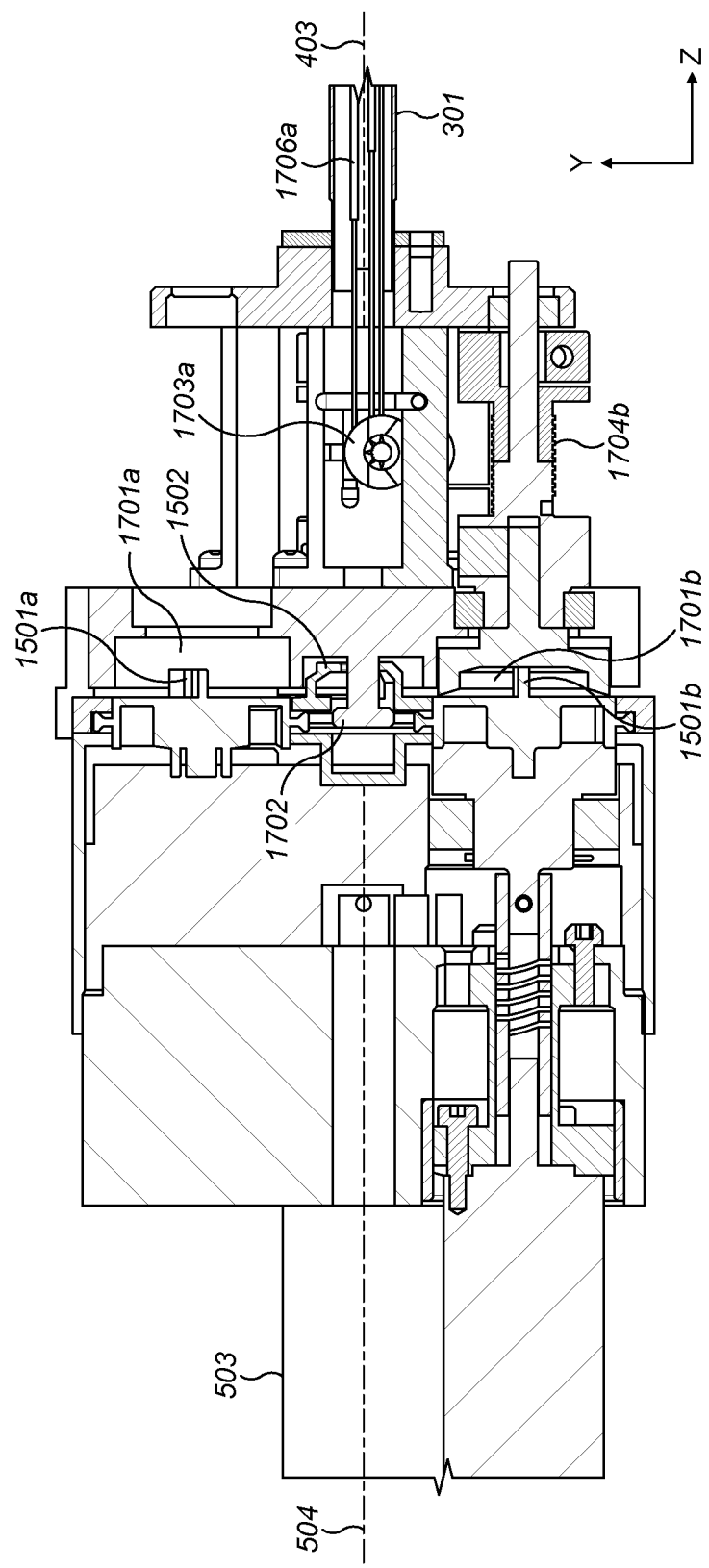
FIG. 17 shows a first cross-sectional view of the drive assembly interface shown in FIG. 15 being connected to an instrument interface of an instrument.
Figure 18:
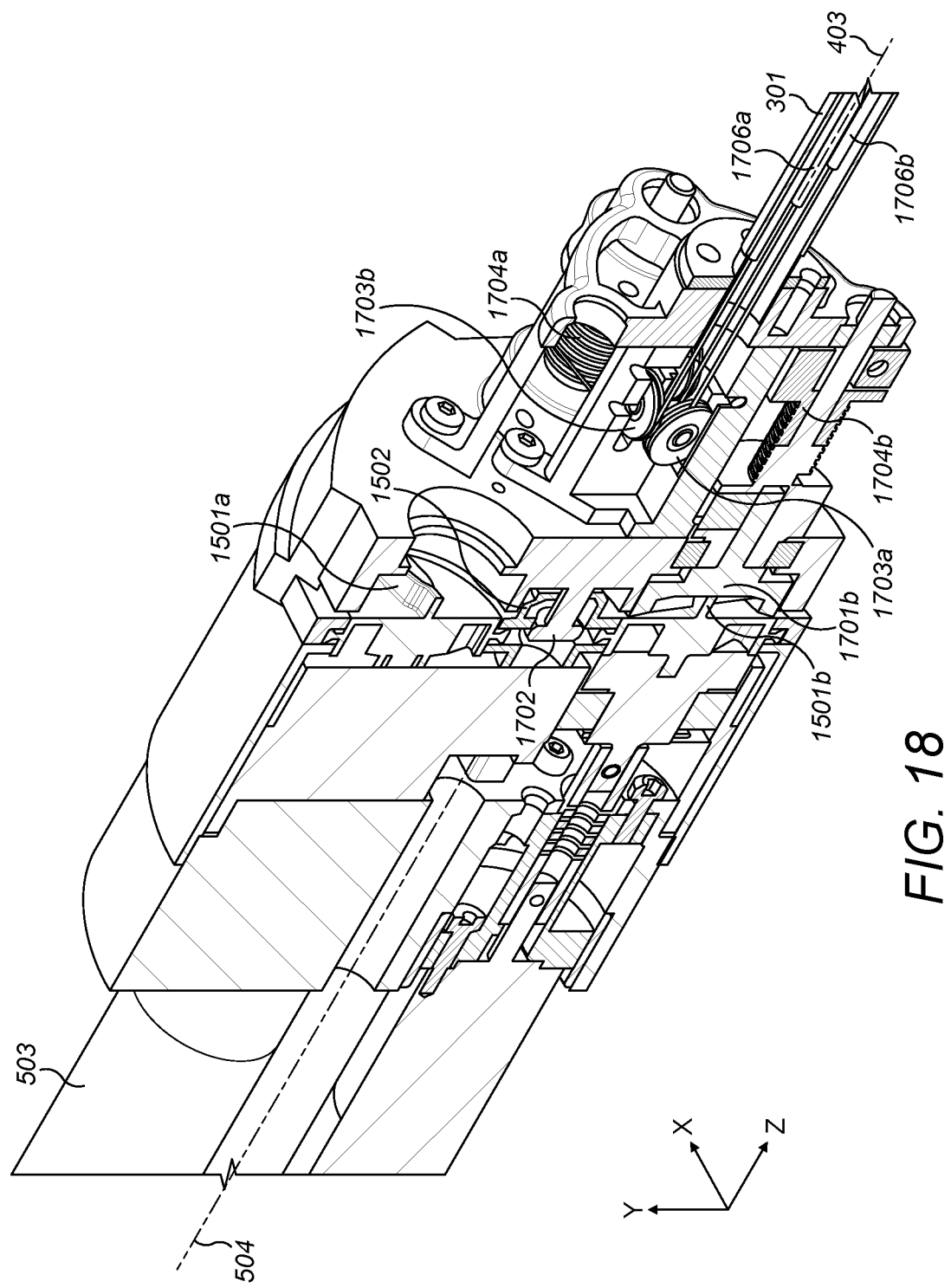
FIG. 18 shows a second cross-sectional view of the drive assembly interface shown in FIG. 15 being connected to the instrument interface of an instrument.
Figure 19:
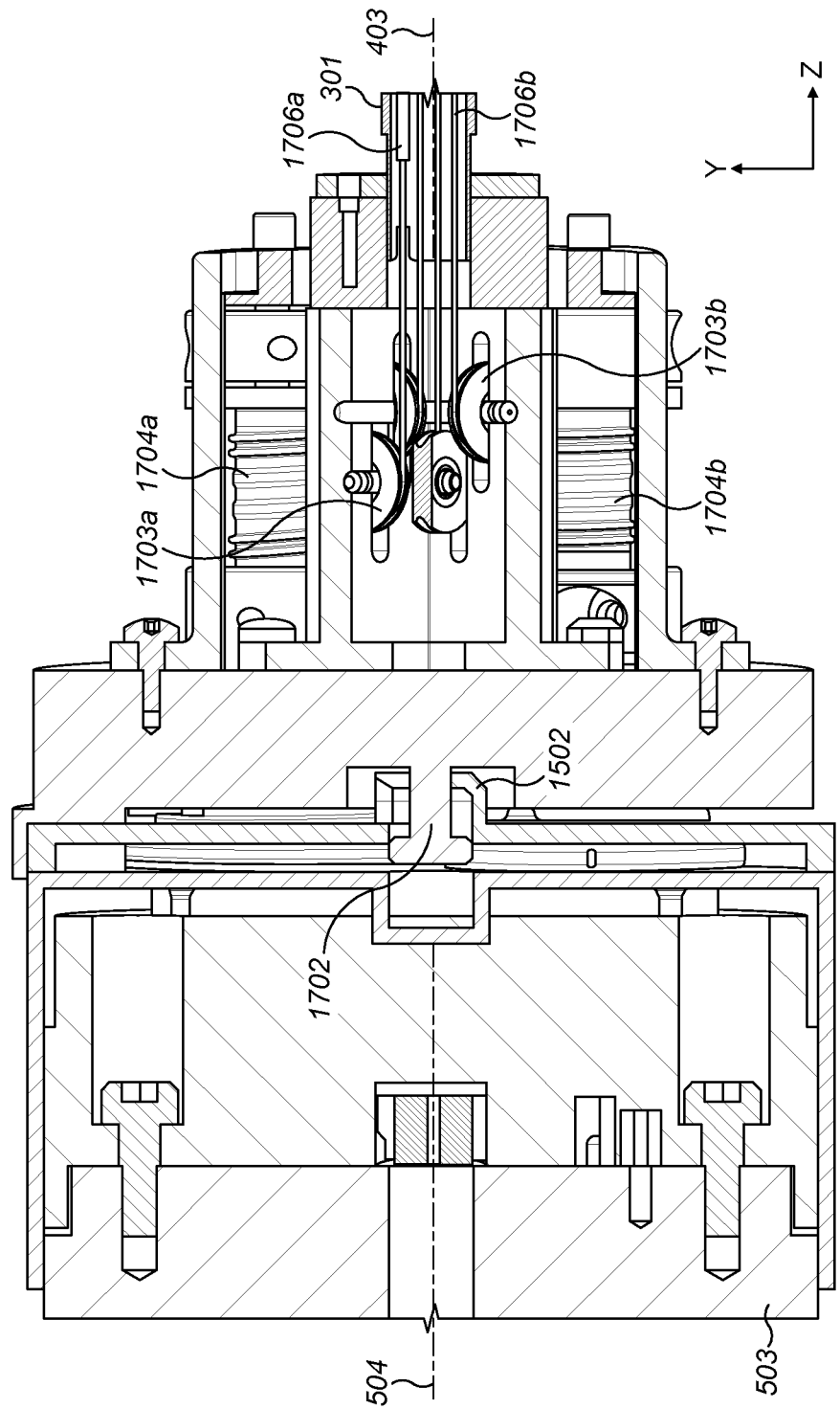
FIG. 19 shows a third cross-sectional view of the drive assembly interface shown in FIG. 15 being connected to the instrument interface of an instrument.

FIGS. 15 to 19 illustrate an example in which a rotary interface is used (rather than a linear interface as in the previous examples). In particular, FIG. 15 shows a perspective view of a drive assembly interface of a terminal link of a robot arm; FIG. 16 shows a front view of the drive assembly interface; and FIGS. 17 to 19 show cross-sectional views of the drive assembly interface being connected to an instrument interface of an instrument. Common reference numerals are used in FIGS. 15 to 19 to denote the same components in the different figures. Each of FIGS. 15 to 19 shows the direction of the X, Y and Z axes, wherein the Z direction is along the longitudinal axis of the terminal link and along the longitudinal axis of the shaft of the instrument, and wherein the Y direction is the detachment direction. The drive assembly interface comprises four drive elements: 1501a, 1501b, 1501c and 1501d. In this example, the drive elements are rotary drive elements which can rotate about respective axes parallel to the longitudinal axis 504 of the terminal link (i.e. they can rotate about respective axes which are parallel to the Z direction). As in the examples described above, the drive elements are arranged in a plane which is perpendicular to the longitudinal axis 504 of the terminal link (which is parallel to the Z direction). In particular, the drive elements are arranged in a plane which is parallel to the direction of detachment (i.e. along the Y direction).

Each of the drive assembly interface elements (1501a, 1501b, etc.) engages with a corresponding instrument interface element (1701a, 1701b, etc.) of an instrument interface of an instrument (shown in FIGS. 17 to 19). The arm can cause the drive assembly interface elements 1501 to rotate, which in turn causes the instrument interface elements 1701 to rotate. In this way, rotational force (i.e. torque) can be transferred over the interface from the drive assembly interface elements to the instrument interface elements. The instrument interface is attached to the shaft 301 of the instrument. Each instrument interface element is attached to a capstan 1704 (which may be referred to as a "spindle"), around which driving elements 1706 can be wound. The driving elements 1706a, 1706b are for driving one or more joints of the articulation of the instrument. In this example, the driving elements (1706a, 1706b) are flexible cables allowing them to be wound around the capstans (1704a, 1704b). Each of the driving elements 1706 is arranged to move around a respective redirecting pulley 1703 and through the shaft 301 of the instrument. When an instrument interface element 1701 is rotated, the corresponding capstan 1704 rotates which causes the corresponding driving element 1706 to move through the shaft 301 in a direction parallel to the longitudinal axis 403 of the shaft.

In order to detach the instrument from the arm, the instrument interface can be moved in the detachment direction (parallel to the Y direction) relative to the drive assembly interface (i.e. upwards in FIGS. 15 to 19). However, the engagement of the drive assembly interface elements 1501 with the instrument interface elements 1701 may prevent the movement of the instrument along the detachment direction if the drive assembly interface elements (and the corresponding instrument interface elements) are not in a particular configuration. The drive assembly interface elements (and the corresponding instrument interface elements) have an elongate shape, such that they can be aligned with a particular direction. In particular, as illustrated best in FIGS. 15 and 16, the instrument can only be removed from (or be attached to) the arm when the drive elements are all vertical, i.e. all aligned with the detachment direction. For example, the drive assembly interface elements 1501b and 1501c shown in FIG. 16 are in the correct configuration in order for the instrument to be detached from the arm (i.e. their elongate shapes are aligned with the detachment direction), but the drive assembly interface elements 1501a and 1501d shown in FIG. 16 are not in the correct configuration in order for the instrument to be detached from the arm (i.e. their elongate shapes are not aligned with the detachment direction). The surgical robot arm is configured to, when the robotic surgical instrument is to be detached from the surgical robot arm, drive the drive assembly interface elements to the particular configuration within their ranges of motion (e.g. to be vertical) in which the robotic surgical instrument is detachable from the surgical robot arm in the detachment direction. The robotic surgical instrument can then be detached from the surgical robot arm by moving it in the detachment direction (i.e. in the Y direction).

In the example shown in FIGS. 15 and 16, each of the drive assembly interface elements 1501 have an order of rotational symmetry of 1. For example, as shown in FIGS. 15 and 16, each of the drive assembly interface elements 1501 may have one end that is thicker than the other end, and the corresponding instrument interface elements with which they engage have a consistent shape, i.e. they also have an order of rotational symmetry of 1. This means that there is only one position throughout a full 360 degree rotation at which the drive assembly interface elements 1501 engage with the corresponding instrument interface elements 1701. Therefore, the control system can determine the pose of the end effector with less ambiguity than if the interface elements had a higher order of rotational symmetry.

In some examples (not shown in the Figures), the interface elements with positions having larger Y component values are thinner than the interface elements with positions having smaller Y component values. For these examples, in normal operation, if the instrument were to be detached then the arm would drive the interface elements 1501 to the described particular configuration (e.g. a vertical orientation with the thicker end at the bottom), and then the instrument could be detached by moving it along the detachment direction (i.e. along the Y direction). In this example, if an interface element 1501 was vertical, but with the thicker end at the top, then the instrument could not be detached by moving it along the detachment direction (i.e. along the Y direction). So in this example, each interface element only has one particular configuration (e.g. a vertical orientation with the thicker end at the bottom) in which the instrument can be detached from the arm. In other examples, it is possible that each interface element may have more than one particular configuration in which the instrument can be detached from the arm, e.g. the ends of the interface elements could be the same thickness, although possibly still different shapes to allow them to still have an order of rotational symmetry of 1.

However, in examples such as those shown in FIGS. 15 to 19 in which the interface elements with positions having larger Y component values are not thinner than the interface elements with positions having smaller Y component values, the instrument might not be detachable by moving it solely along the detachment direction (i.e. along the Y direction). Furthermore, in any of the examples described herein, if the arm has faulted then it may not be possible to drive the interface elements to a particular orientation (e.g. the described vertical orientation) in order for the instrument to be safely detached. This may cause a problem if the end effector of the instrument is close to, or inside, a patient when the fault occurs.

So, in order to address this problem, and to provide a safe way to remove the instrument from the arm in the case of a fault with the arm which prevents the interface elements being driven to the vertical orientation, the drive assembly interface and the instrument interface are provided with interlocking protrusions 1502 and 1702. The protrusion 1502 in the drive assembly interface is shown in FIGS. 15 to 19 as a groove (in particular a U-shaped groove), and the protrusion 1702 in the instrument is housed in the groove 1502 when the instrument is attached to the arm. The interlocking protrusions allow the instrument to be moved towards the patient along the Z direction (i.e. away from the interface plane in a direction perpendicular to it) by a small permissible amount (but by no more than this small permissible amount). This small permissible amount may be 4 mm. More generally, the small permissible amount may be between 3 mm and 5 mm. Even more generally, the small permissible amount may be between 2 mm and 6 mm. The small permissible movement is small enough to avoid (or reduce to negligible levels) damage to the patient (e.g. if the instrument is inside the patient) but is large enough to disengage the drive assembly interface elements 1501 from the instrument interface elements 1701. Once the instrument and interface are disengaged, the instrument can be retracted upwards in the detachment direction (the Y direction) parallel to the interface plane, thereby detaching the instrument from the robot arm. In normal operation when the instrument is engaged with the drive assembly interface, the protrusion 1702 on the instrument is housed in the U-shaped groove 1502, and physically stops the instrument from being pulled further into the patient than the small permissible amount described above.

In the examples shown in FIGS. 15 to 19, rotational drive from a motor is transformed into rotation of the driving elements around the capstan. This can be a more efficient system for transferring force from the drive assembly of the robot arm to the end effector than a system in which rotational drive is transformed into linear drive across the interface.

The examples of drive assembly interfaces and instrument interfaces described herein provide enable a more compact drive assembly interface. The arrangement of the drive assembly interface elements and instrument interface elements also enables the instrument to be detached from the arm in a direction perpendicular to the longitudinal axis of the terminal link of the robot arm/instrument shaft regardless of the configuration of the robot arm or instrument. It is also not necessary to move the instrument interface elements or drive assembly interface elements when detaching the instrument from the robot arm. Further, no movement (or very little movement) of the instrument/robot arm towards the patient is required in order to detach the instrument from the robot arm. In particular, in examples described herein, the robotic surgical instrument is detachable from the surgical robot arm in the detachment direction (i.e. the Y direction) when each drive assembly interface element is anywhere within its range of motion, without first moving the robotic surgical instrument relative to the surgical robot arm in a direction parallel with the longitudinal axis of the terminal link by more than a maximum amount. It is noted that the longitudinal axis of the terminal link is the Z direction which is also parallel to (e.g. collinear with) the longitudinal axis of the shaft of the instrument. In the examples shown in FIGS. 7 to 14, the "maximum amount" is zero. In the example shown in FIGS. 15 to 19, the "maximum amount" is a non-zero amount which is small enough to avoid damage to a patient, but is large enough to disengage the drive assembly interface elements from the instrument interface elements, thereby allowing the robotic surgical instrument to be detached from the surgical robot arm in the detachment direction. Thus, in all of these examples, the instrument can be safely manually detached from the robot arm whilst the instrument is still located at the surgical site and without requiring power from the control system of the robot arm. This is useful as a safety feature in the event of a system fault or low battery status preventing the instrument from being retracted out of the patient's body under robotic control in a safe manner. Furthermore, as the instrument is detachable without moving the instrument interface elements, there is no transfer of drive to the end effector when detaching the instrument from the robot arm, and so the end effector does not move when detaching the instrument from the robot arm. Furthermore, the examples described herein provide a more compact wrist design which is useful for versatility.

The robot described herein could be for purposes other than surgery. For example, the port could be an inspection port in a manufactured article such as a car engine and the robot could control a viewing tool for viewing inside the engine.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A surgical robot arm comprising:
    a terminal link comprising a drive assembly interface, the drive assembly interface comprising drive assembly interface elements, each drive assembly interface element configured to:
    engage an instrument interface element of an instrument interface of a robotic surgical instrument when the surgical robot arm engages the robotic surgical instrument; and
    move relative to the drive assembly interface through a range of motion so as to, when engaged with the instrument interface element, transfer drive to that instrument interface element;
    wherein the drive assembly interface elements are arranged on a plane perpendicular to the longitudinal axis of the terminal link such that the robotic surgical instrument is detachable from the surgical robot arm in a detachment direction parallel to the plane without moving the instrument interface elements relative to the instrument.

2. The surgical robot arm of claim 1 wherein the drive assembly interface elements are arranged on the plane perpendicular to the longitudinal axis of the terminal link such that the robotic surgical instrument is detachable from the surgical robot arm in the detachment direction parallel to the plane when each drive assembly interface element is anywhere within its range of motion, without first moving the robotic surgical instrument relative to the surgical robot arm in a direction parallel with the longitudinal axis of the terminal link by more than a maximum amount.

3. The surgical robot arm of claim 2 wherein said maximum amount is either: (i) zero, or (ii) a non-zero amount which is small enough to avoid damage to a patient, but is large enough to disengage the drive assembly interface elements from the instrument interface elements, thereby allowing the robotic surgical instrument to be detached from the surgical robot arm in the detachment direction.

4. The surgical robot arm of claim 1, wherein each drive assembly interface element is configured to move relative to the drive assembly interface along or parallel to the longitudinal axis of the terminal link.

5. The surgical robot arm of claim 1, wherein each drive assembly interface element is configured to move relative to the drive assembly interface in a direction perpendicular to the longitudinal axis of the terminal link.

6. The surgical robot arm of claim 5, wherein the drive assembly interface elements are configured to move parallel to each other, and wherein each drive assembly interface element is configured to move relative to the drive assembly interface in a direction perpendicular to the detachment direction.

7. The surgical robot arm of claim 6, wherein the range of motion of each drive assembly interface element does not overlap with the range of motion of another drive assembly interface element in the direction perpendicular to the detachment direction.

8. The surgical robot arm of claim 6, wherein each drive assembly interface element is configured to engage its respective instrument interface element in a position offset perpendicular to the longitudinal axis of the terminal link from the positions in which the other drive assembly interface elements are configured to engage their respective instrument interface elements.

9. The surgical robot arm of claim 5, wherein the drive assembly interface elements are in a stepped arrangement on said plane perpendicular to the longitudinal axis of the terminal link, and wherein the drive assembly interface elements are configured to move in non-overlapping planes perpendicular to the longitudinal axis of the terminal link.

10. The surgical robot arm of claim 1, wherein each of the drive assembly interface elements is configured to rotate about a respective axis that is parallel to the longitudinal axis of the terminal link.

11. The surgical robot arm of claim 10, wherein the surgical robot arm is configured to, when the robotic surgical instrument is to be detached from the surgical robot arm, drive the drive assembly interface elements to a particular configuration within their ranges of motion in which the robotic surgical instrument is detachable from the surgical robot arm in the detachment direction.

12. The surgical robot arm of claim 10, wherein the drive assembly interface further comprises a protrusion which is configured to interlock with a corresponding protrusion on the instrument interface, and which allows the instrument to be moved in a direction parallel with the longitudinal axis of the terminal link by a small permissible amount, which is small enough to avoid damage to a patient, but is large enough to disengage the drive assembly interface elements from the instrument interface elements, thereby allowing the robotic surgical instrument to be detached from the surgical robot arm in the detachment direction.

13. A robotic surgical instrument comprising:
    a shaft;
    driving elements running through the shaft for driving an articulation at a distal end of the shaft to articulate an end effector; and
    an instrument interface at a proximal end of the shaft, the instrument interface comprising instrument interface elements, each instrument interface element attached to one of the driving elements and configured to:
    engage a drive assembly interface element of a drive assembly interface of a surgical robot arm when the robotic surgical instrument engages the surgical robot arm; and
    move relative to the instrument interface through a range of motion so as to, when engaged with the drive assembly interface element, transfer drive from the drive assembly interface element to the attached driving element;

wherein the instrument interface elements are arranged on a plane perpendicular to the longitudinal axis of the shaft such that the robotic surgical instrument is detachable from the surgical robot arm in a detachment direction parallel to the plane without moving the instrument interface elements relative to the instrument.

14. The robotic surgical instrument of claim 13, wherein the instrument interface elements are arranged on the plane perpendicular to the longitudinal axis of the shaft such that the robotic surgical instrument is detachable from the surgical robot arm in a detachment direction parallel to the plane when each instrument interface element is anywhere within its range of motion, without first moving the robotic surgical instrument relative to the surgical robot arm in a direction parallel with the longitudinal axis of the shaft by more than a maximum amount.

15. The robotic surgical instrument of claim 14, wherein said maximum amount is either: (i) zero, or (ii) a non-zero amount which is small enough to avoid damage to a patient, but is large enough to disengage the drive assembly interface elements from the instrument interface elements, thereby allowing the robotic surgical instrument to be detached from the surgical robot arm in the detachment direction.

16. The robotic surgical instrument of claim 13, wherein each instrument interface element is configured to move relative to the instrument interface in a direction perpendicular to the longitudinal axis of the shaft.

17. The robotic surgical instrument of claim 16, wherein the instrument interface elements are configured to move parallel to each other.

18. The robotic surgical instrument of claim 16, wherein the instrument interface elements are configured to move in non-parallel directions relative to each other.

19. The robotic surgical instrument of claim 16, wherein the instrument interface elements are in a stepped arrangement on said plane perpendicular to the longitudinal axis of the shaft, and wherein the instrument interface elements are configured to move in non-overlapping planes perpendicular to the longitudinal axis of the shaft.

20. The robotic surgical instrument of claim 13 wherein each of the instrument interface elements is configured to rotate about a respective axis that is parallel to the longitudinal axis of the shaft, wherein the instrument interface further comprises a protrusion which is configure to interlock with a corresponding protrusion on the drive assembly interface, and which allows the instrument to be moved in a direction parallel with the longitudinal axis of the shaft by a small permissible amount, which is small enough to avoid damage to a patent, but is large enough to disengage the instrument interface elements from the drive assembly interface elements, thereby allowing the robotic surgical instrument to be detached from the surgical robot arm in the detachment direction.

* * * * *